(12) United States Patent
Jones et al.

(10) Patent No.: US 12,319,398 B2
(45) Date of Patent: Jun. 3, 2025

(54) FABRICATION OF MULTI-SEGMENT SPARS

(71) Applicant: The Boeing Company, Chicago, IL (US)

(72) Inventors: Darrell D. Jones, Mill Creek, WA (US); Daniel R. Smith, Woodinville, WA (US); Carlos Walker, Seattle, WA (US); Kurtis Shuldberg Willden, Kent, WA (US); Hiteshkumar M. Patel, Snohomish, WA (US); Jacob E. Koopmans, Everett, WA (US); Scott Krajca, Seattle, WA (US); James P. Dobberfuhl, Clinton, WA (US); Marcus C. Hart, Edmonds, WA (US); Gregory R. Klempel, Seattle, WA (US); Steven Kuan-Chi Wu, Seattle, WA (US); Justin K. Alfred, Seattle, WA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 17/454,399

(22) Filed: Nov. 10, 2021

(65) Prior Publication Data
US 2022/0153400 A1    May 19, 2022

Related U.S. Application Data

(60) Provisional application No. 63/115,042, filed on Nov. 18, 2020.

(51) Int. Cl.
*B64C 1/06* (2006.01)
*B29C 70/34* (2006.01)
(Continued)

(52) U.S. Cl.
CPC ............ *B64C 1/065* (2013.01); *B29C 70/342* (2013.01); *B29K 2307/04* (2013.01); *B29L 2031/3085* (2013.01)

(58) Field of Classification Search
CPC .......... B64C 1/065; B64C 3/18; B64C 3/182; B64C 3/185
See application file for complete search history.

(56) References Cited

U.S. PATENT DOCUMENTS 8,915,471 B2 * 12/2014 Nordman ................ B64C 3/182
                                                          244/131
10,836,121 B2 * 11/2020 Carlson .................... B64F 5/00
(Continued)

FOREIGN PATENT DOCUMENTS

| EP | 2186622 A1 | 5/2020 |
|----|------------|--------|
| EP | 3650333 A1 | 5/2020 |
| WO | 2010122325 A1 | 10/2010 |

OTHER PUBLICATIONS

Netherlands Patent Office Written Opinion and Search Report with English Translation, dated Aug. 6, 2021, regarding Application No. NL2027428; 18 pages.
(Continued)

*Primary Examiner* — Michael H Wang
(74) *Attorney, Agent, or Firm* — Yee & Associates, P.C.

(57) ABSTRACT

Systems and methods are provided for fabricating multiple segment spars for an aircraft. In one example the method includes fabricating preforms of fiber reinforced material for spar segments, hardening the preforms to form the spar segments, and bonding the spar segments together to form a completed spar detail. In addition to bonding, other examples include co-curing and fastening the spar segments. In additional examples, the spar segments include kinks or sub-kinks as described.

20 Claims, 19 Drawing Sheets

FIG. 12

(51) Int. Cl.
*B29K 307/04* (2006.01)
*B29L 31/30* (2006.01)

(56) References Cited

U.S. PATENT DOCUMENTS

| | | | |
|---|---|---|---|
| 2010/0116938 A1* | 5/2010 | Kline | B29C 66/9121 |
| | | | 156/391 |
| 2011/0139932 A1* | 6/2011 | Matheson | B29D 99/0014 |
| | | | 156/182 |
| 2011/0215202 A1* | 9/2011 | Rhoden | B64C 3/185 |
| | | | 244/131 |
| 2013/0233973 A1* | 9/2013 | Nordman | B64C 3/182 |
| | | | 244/131 |
| 2015/0231835 A1 | 8/2015 | Pridie | |
| 2016/0121589 A1* | 5/2016 | Pham | B29C 70/342 |
| | | | 156/538 |
| 2016/0257427 A1* | 9/2016 | Humfeld | B29C 66/12841 |
| 2017/0225767 A1* | 8/2017 | King | B64C 3/187 |
| 2018/0072399 A1* | 3/2018 | Walker | B64C 1/26 |
| 2021/0070419 A1* | 3/2021 | Decker | B64C 3/18 |
| 2022/0033060 A1* | 2/2022 | Behzadpour | B64C 3/32 |

OTHER PUBLICATIONS

Extended European Search Report dated Apr. 8, 2022 regarding EP Application No. 21207625.1; 6 pages.

* cited by examiner

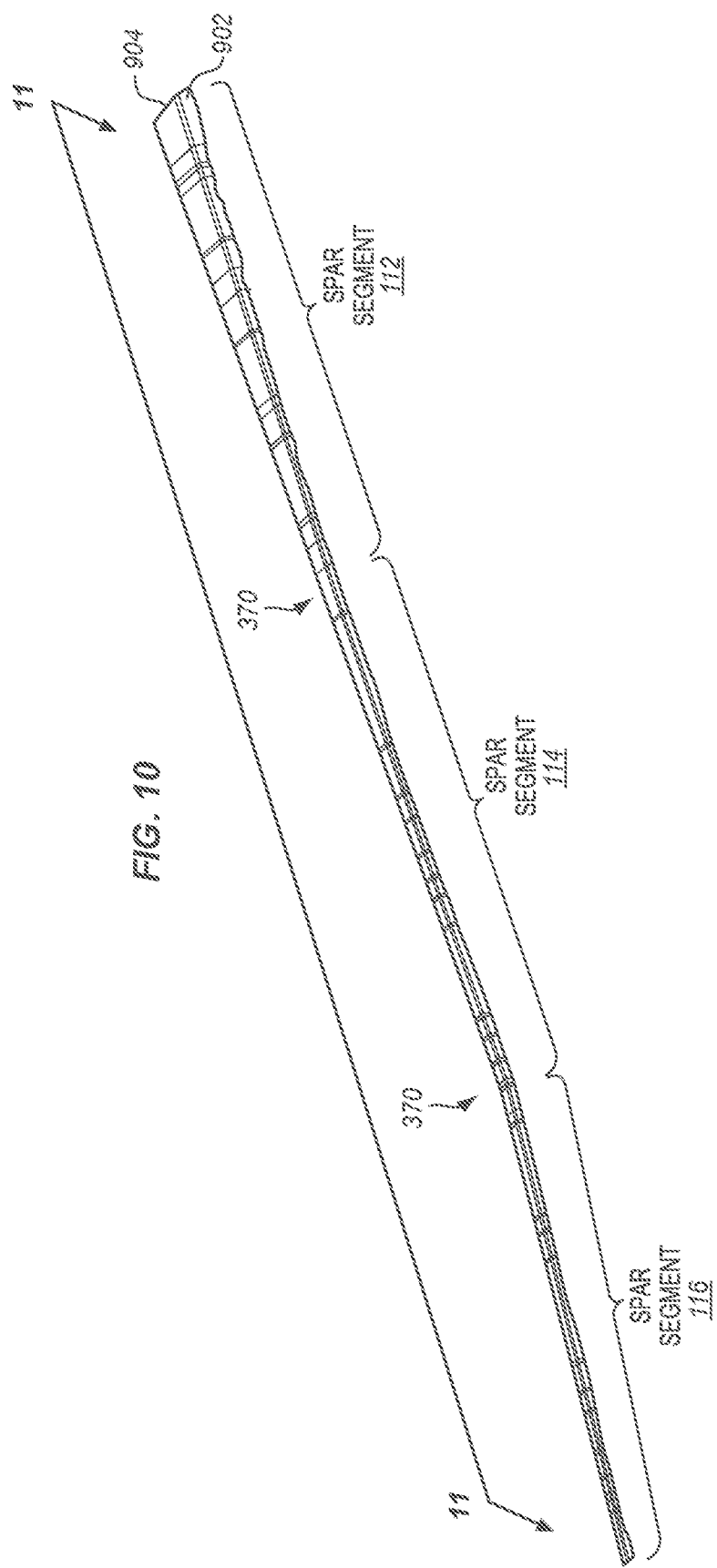

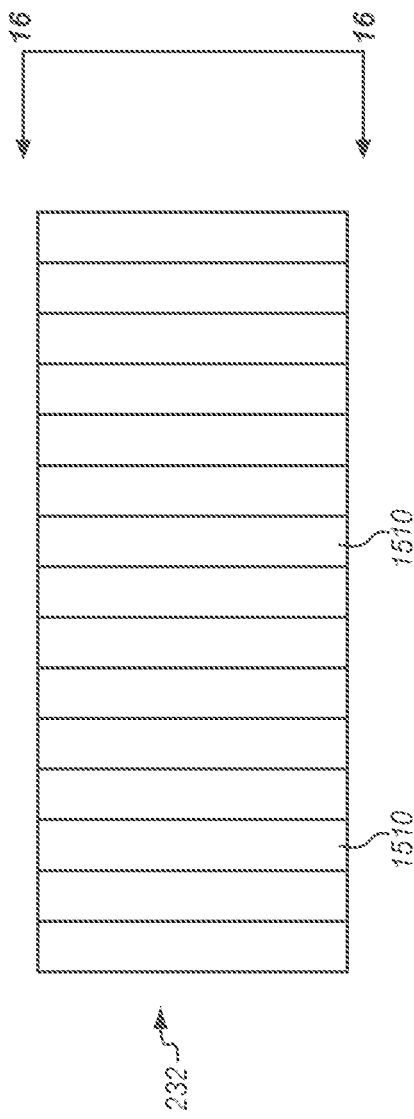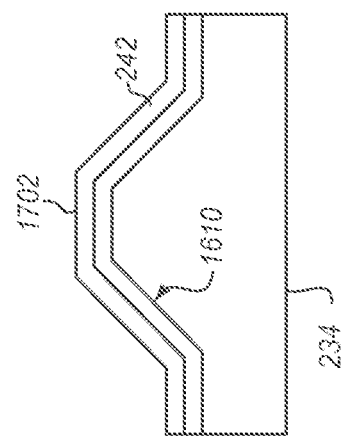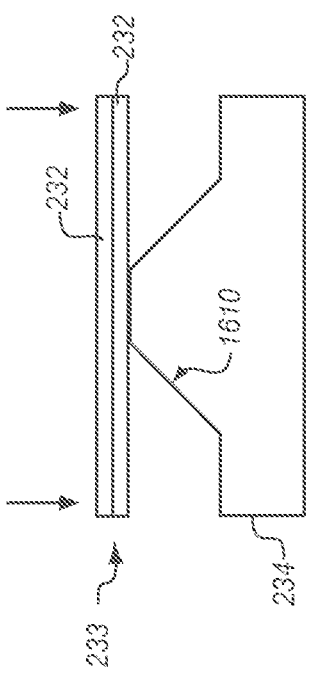

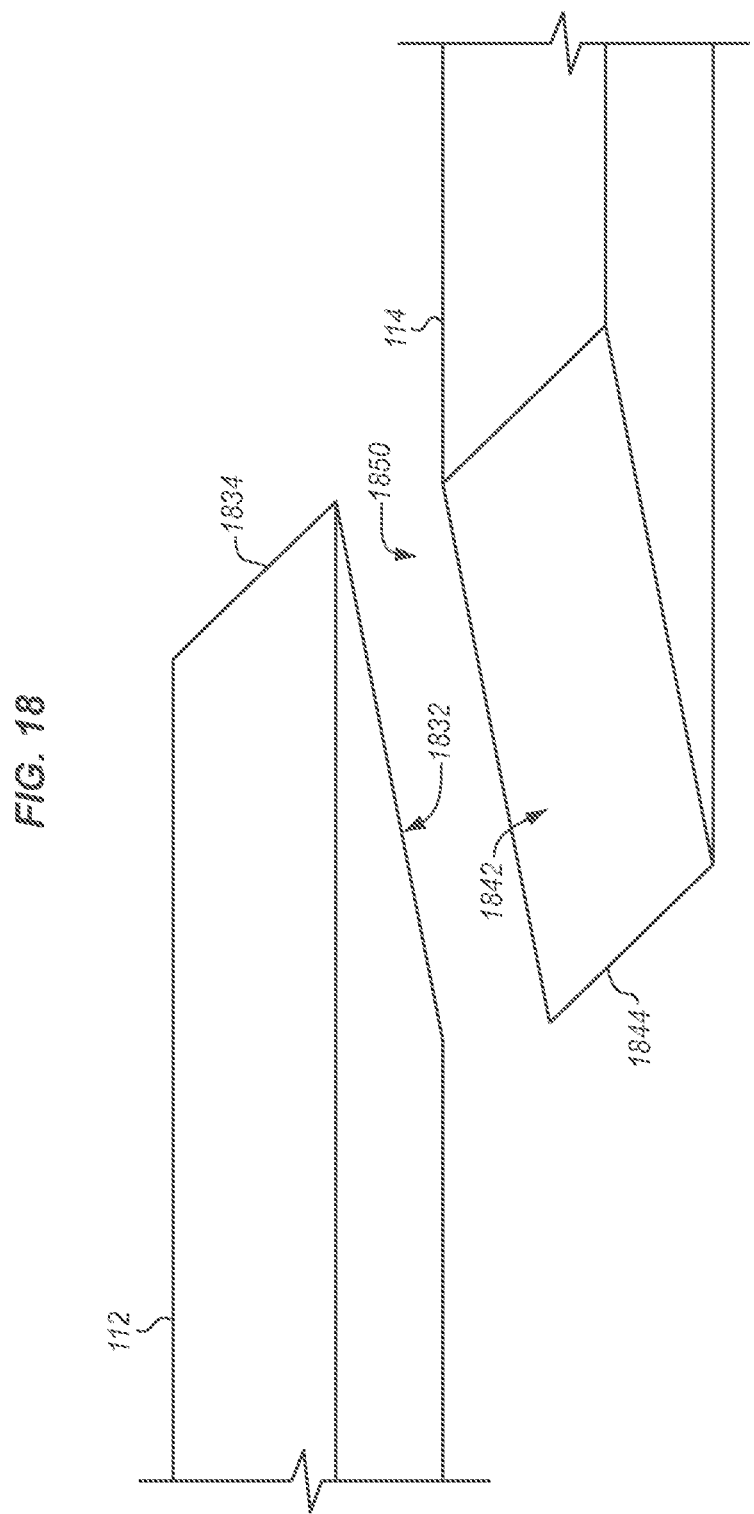

FABRICATION OF MULTI-SEGMENT SPARS

CROSS-REFERENCE TO RELATED APPLICATION

This application claims the benefit of U.S. Provisional Patent Application Ser. No. 63/115,042 filed Nov. 18, 2020, and entitled "Fabrication of Multi-Segment Spars," which is incorporated herein by reference in its entirety.

FIELD

The disclosure relates to the field of fabrication, and in particular, to fabrication of composite parts for an aircraft.

BACKGROUND

Spars of an aircraft run within a wing from the inboard direction to the outboard direction, and provide structural strength to the wing. Spars of an aircraft may be fabricated, for example, from composite materials. Because wings are particularly lengthy components of an aircraft, multiple spars extend the length of the wing. The large dimensions of spars increase the complexity and expense of equipment dedicated to layup, consolidation, hardening, assembling spars, and assembling wings. This issue is further complicated by the fact that many spars exhibit complex curvatures that correspond with that of a wing, which further complicates the fabrication process.

Therefore, it would be desirable to have a method and apparatus that take into account at least some of the issues discussed above, as well as other possible issues.

SUMMARY

Embodiments described herein provide for spars formed from multiple segments that are structurally integrated together via co-curing, co-bonding, or fastener installation. By assembling the spars from multiple segments, the size of equipment used to fabricate the spars may be reduced. Furthermore, because the segments are smaller than the entire spar, each segment may exhibit a simpler curvature (e.g., a more linear profile) than the resulting spar, which further reduces the complexity of equipment used for layup, curing, etc.

In one aspect, a method for fabricating a spar detail for an aircraft is provided. The method includes fabricating preforms of fiber reinforced material for spar segments, hardening the preforms to form the spar segments, and bonding the spar segments together to form a completed spar detail.

In another aspect, a spar for an aircraft is provided. The spar includes a first spar segment that comprises fiber reinforced material, the first spar segment including a splice region, a second spar segment that comprises fiber reinforced material, the second spar segment including a first splice region and disposed in series with the first spar segment, and a splice doubler covering at least a portion of the splice region of the first spar segment and the first splice region of the second spar segment, the splice doubler bonded to the first spar segment and the second spar segment.

In still another aspect, a method for fabricating a spar detail for an aircraft is provided. The method includes fabricating preforms of fiber reinforced material for a first spar segment and a second spar segment, splicing an end of the first spar segment preform to an end of the second spar segment preform to define a splice region, applying at least one preform for a splice doubler to the splice region, and concurrently hardening the preforms for the spar segments and the splice doublers to form a portion of the spar detail.

In yet another aspect, a spar detail is provided. The spar detail includes a preform for a first spar segment, the first spar segment including a splice region, a preform for a second spar segment, the second spar segment including a splice region, the splice regions disposed in series with one another in a spliced relationship, and a splice doubler preform, the preforms and the splice doubler preform concurrently cured while the splice doubler preform is covering at least a portion of the spliced regions to form a portion of the spar detail.

In yet another aspect, a method for fabricating a spar detail for an aircraft is provided. The method includes fabricating preforms of fiber reinforced material for spar segments, hardening the preforms to form the spar segments, and applying fasteners that couple the spar segments together to form a completed spar detail.

In still yet another aspect, a spar detail for an aircraft is provided. The spar detail includes a first spar segment that comprises fiber reinforced material, a second spar segment that comprises fiber reinforced material and is disposed in series with the first spar segment, a splice doubler covering a splice region between the first spar segment and the second spar segment, and fasteners that are installed through the splice doubler, the first spar segment, and the second spar segment to form at least a portion of the spar detail.

In another aspect, a method for fabricating a spar for an aircraft is provided. The method includes fabricating preforms of fiber reinforced material for spar segments, at least one of the spar segments comprising a kink, each kink being contained entirely within a preform, hardening the preforms to form spar segments, and assembling the spar segments together to form a completed spar detail exhibiting at least one of the kinks.

In still another aspect, an aircraft spar is provided. The aircraft spar includes a first spar segment that comprises fiber reinforced material, at least one splice region, a second spar segment that comprises fiber reinforced material, at least one splice region, and a kink outside of the splice regions, with respective splice regions disposed in series with one another, and a splice doubler that covers at least a portion of the splice region of the first spar segment and at least a portion of the corresponding splice region of the second spar segment, the splice doubler coupled to the first spar segment and the second spar segment.

In yet another aspect, a method for fabricating a spar detail for an aircraft is provided. The method includes fabricating a preform for a first spar segment, the preform including a sub-kink proximate one end of the first spar segment, fabricating a preform for a second spar segment, the preform including a sub-kink proximate one end of the second spar segment, aligning the ends of the preforms such that the sub-kinks are proximate one another within a splice region, and joining the spar segments together in the splice region to form at least a portion of the spar detail exhibiting a kink.

In another aspect, a spar detail for an aircraft is provided. The spar detail includes a first spar segment that comprises fiber reinforced material and includes a sub-kink disposed at an end, a second spar segment that comprises fiber reinforced material and includes a sub-kink disposed at an end, the end of the first spar segment having the sub-kink adjacent to the end of the second spar segment having the sub-kink, such that the sub-kinks together form a kink and the ends define a splice region, and a splice doubler that structurally unites the first spar segment and the second spar segment within the splice region.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 10-11 depict spar details in an illustrative embodiment.

FIGS. 15-17 depict formation of a flat charge into a preform having a predefined cross-section in an illustrative embodiment.

FIG. 18 depicts a scarf joint between spar segments in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The spars and spar details described herein may be fabricated as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
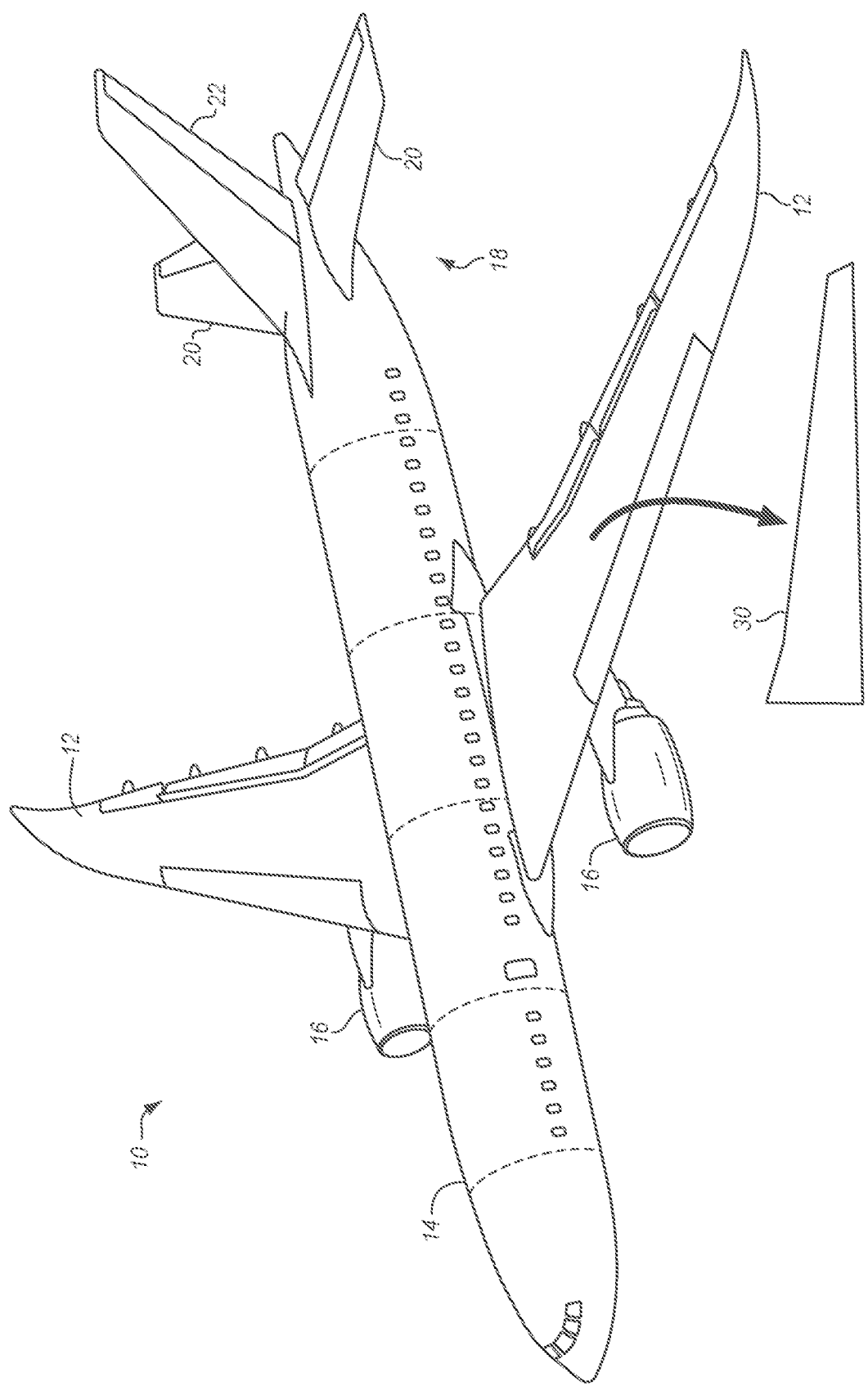
FIG. 1 is a perspective view of an aircraft that includes a fully assembled wing in an illustrative embodiment.

Turning now to FIG. 1, an illustration of a representative aircraft 10 is depicted in which an illustrative embodiment of a wing panel and/or a wing assembly produced in accordance with aspects of the present disclosure may be implemented. In other words, aircraft 10 is an example of an aircraft which can be formed using composite parts, wing panels, and/or wing assemblies produced according to one or more aspects discussed herein. In this illustrative example, aircraft 10 has wings 12 attached to and extending to either side of a fuselage 14. Aircraft 10 includes an engine 16 attached to each wing 12. Disposed at the rear end of fuselage 14 is tail section 18, which includes an opposed pair of horizontal stabilizers 20 and a vertical stabilizer 22. Wings 12 are formed of an upper wing panel 30 and a lower wing panel (not shown) joined together, with an assembly of ribs and spars (not shown) at least partially forming the interior structure thereof.

Figure 1A:
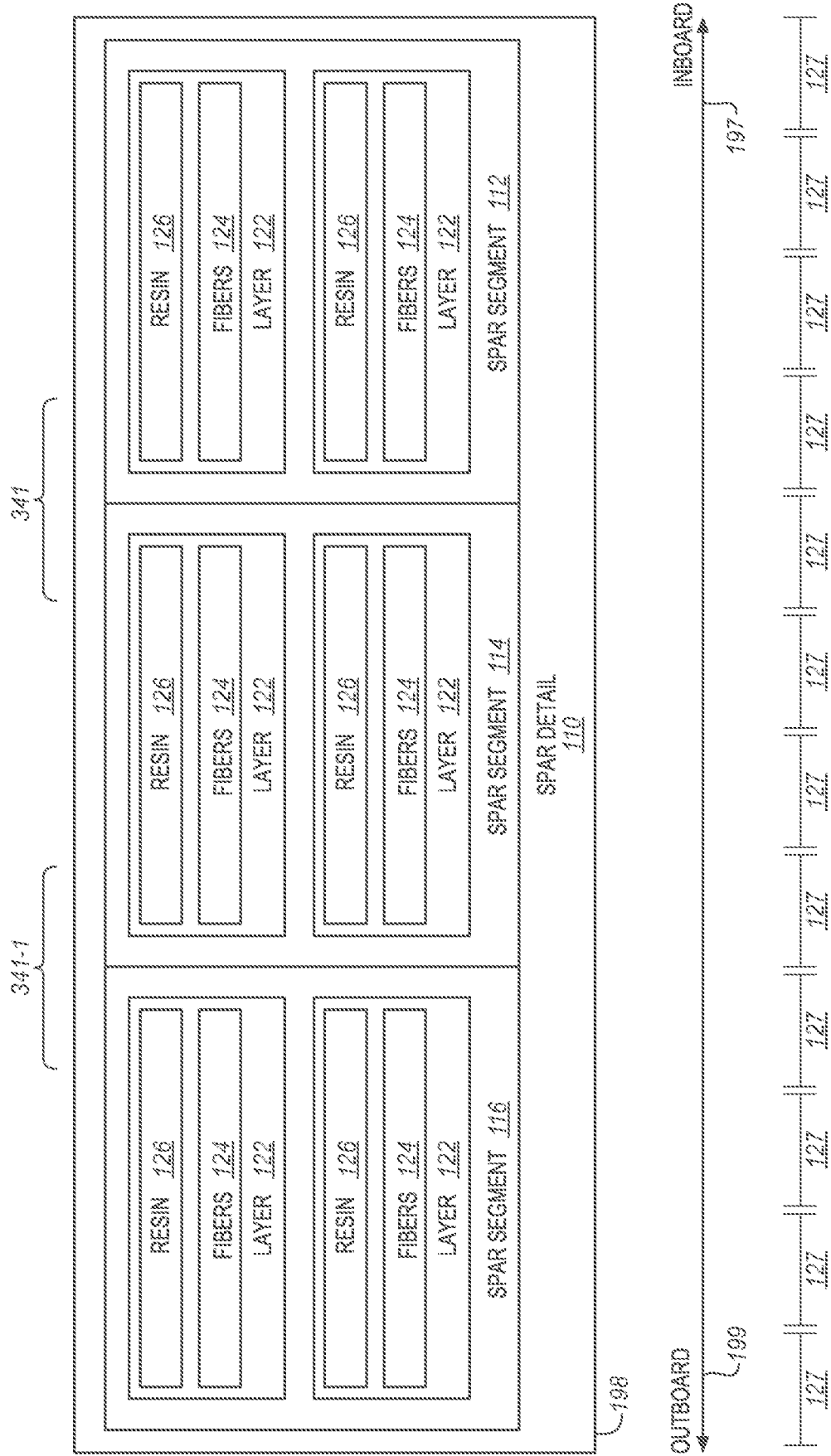
FIG. 1A is a block diagram of a spar detail in an illustrative embodiment.
Figure 9:
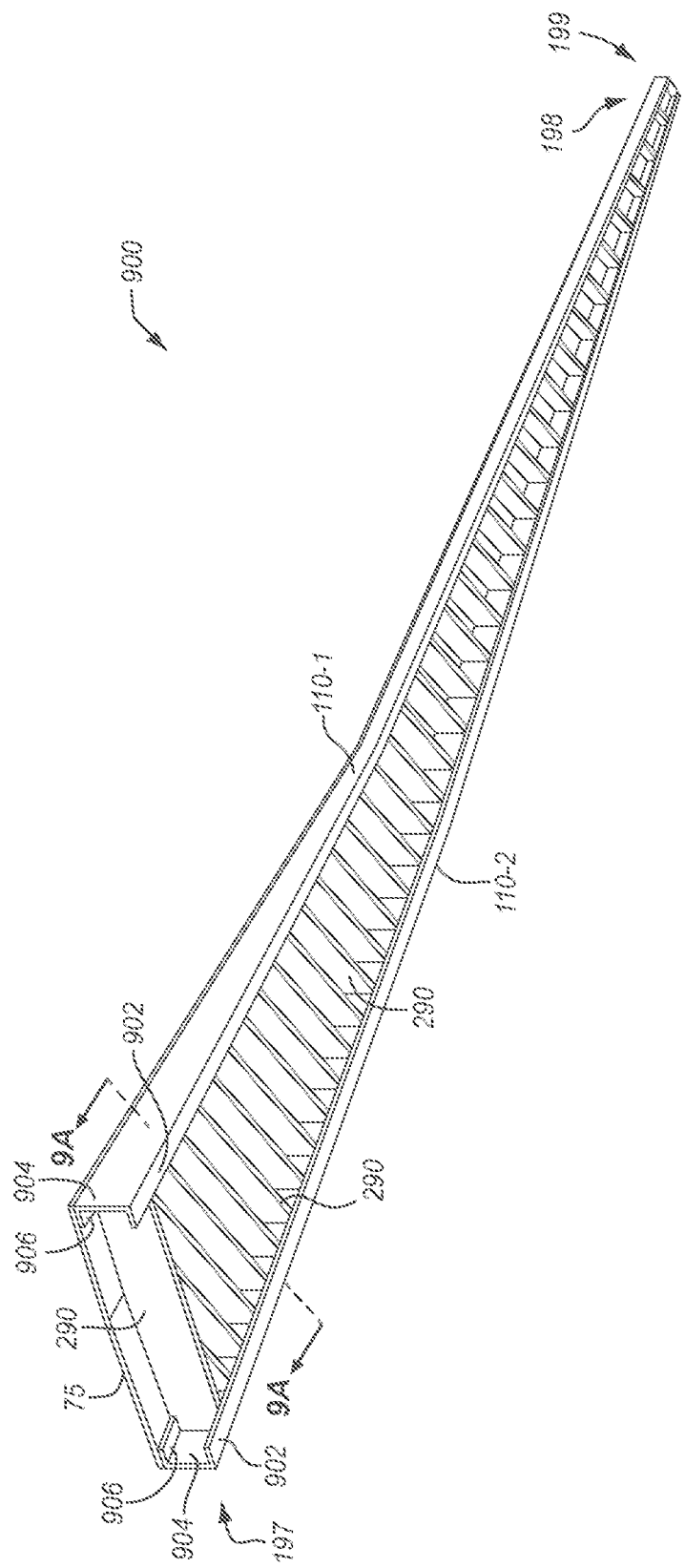
FIG. 9 depicts a wing of an aircraft that includes spars in an illustrative embodiment.

FIG. 1A is a block diagram of a spar detail 110 in an illustrative embodiment. As used herein, a spar detail 110 refers to a structural component. In some illustrative examples, the spar detail 110 may be referred to as an aircraft spar detail. In some illustrative examples, he spar detail 110 may be referred to as a multiple segment spar detail. Specifically, a spar detail 110 is a component that has been assembled from spar segments 112, 114, and 116, and has yet to be attached to other wing components, such as ribs or wing panels, as part of a finished or nearly finished fabrication. A spar detail 110 becomes an aft spar 110-1 or a front spar 110-2 (FIG. 9) after another part (bracket, stiffener, fastener, etc.) is permanently attached to it. A "spar installation" (also referred to herein as a "spar") refers to the aft spar 110-1 and front spar 110-2 that is attached as part of a wing box (FIG. 9). A spar detail 110 is one of the components that provides structural strength to a wing of an aircraft by extending from an inboard end 197 to an outboard end 199. For example, some spar details 110 extend from a side of body intersection of an aircraft towards a wing tip 198. Some spar details 110 terminate at the wing tip 198, while in other embodiments, terminate before reaching the wing tip 198. Spar detail 110 may be considered the "core" of a spar (e.g., spar 110-1, 110-2 of FIG. 9) that provides a majority of the structural strength of the spar (e.g., spar 110-1, 110-2). A plurality of lengthwise portions 127 of the spar segments 112, 114, 116 of spar detail 110 are also illustrated in FIG. 1A. For clarity, spar segment 112 will sometimes be referred to as first spar segment 112, spar segment 114 will sometimes be referred to as second spar segment 114, and spar segment 116 will sometimes be referred to as third spar segment 116.

In this embodiment, spar detail 110 is fabricated from multiple spar segments 112, 114, 116 (see also FIG. 3), which each define a segment/portion of the spar detail 110 from inboard end 197 to outboard end 199. Each spar segment 112, 114, 116 comprises multiple layers 122 of fibers 124 (e.g., continuous carbon fibers, glass fibers, etc.) and resin 126 (e.g., thermoset resin, thermoplastic, etc.). Spar detail 110 is fabricated from spar segments 112, 114, 116 which are preformed and/or hardened prior to assembly. Thus the overall fabrication process for a spar 110-1, 110-2 fabricated from spar segments 112, 114, 116 can be performed quickly and efficiently, for example, each spar segment 112, 114, 116 in parallel, using equipment that is less expensive and less massive than for fabrication systems that do not fabricate spars from segments.

Figure 2:
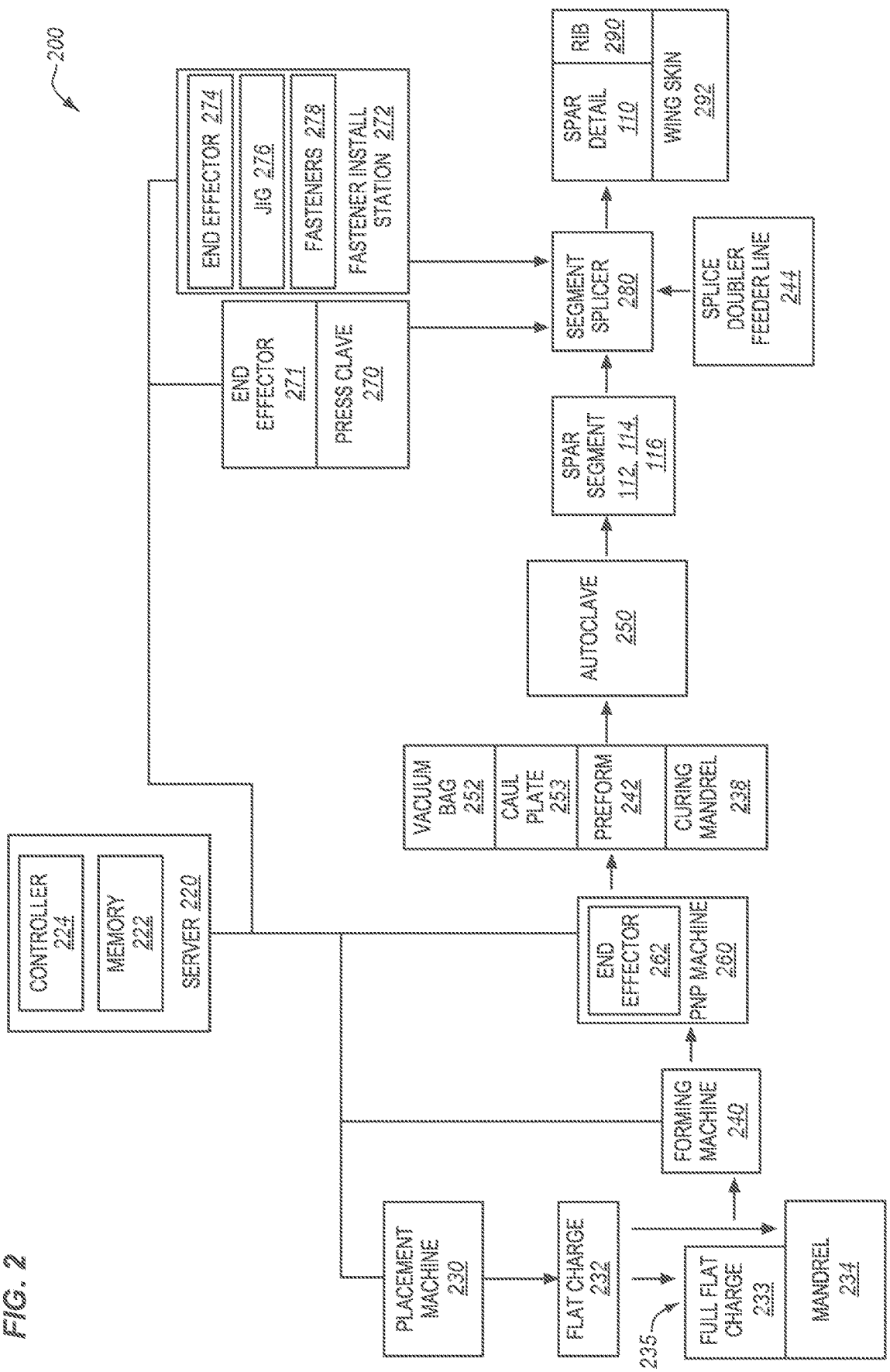
FIG. 2 illustrates a system that forms spar details from multiple segments in an illustrative embodiment.

FIG. 2 illustrates a system 200 that forms the spar details 110 from spar segments 112, 114, 116 in FIG. 1 in an illustrative embodiment. In this embodiment, system 200 includes a placement machine 230, such as dispensing tows of fiber reinforced material that forms one or more flat charges 232 (e.g., planar charges) of a single ply or when combined with other flat charges 232 to create a full flat charge 233 laminate upon mandrel 234. In this embodiment, the flat charges 232 and/or the full flat charge 233 are formed by forming machine 240 to create preform 242. The preform 242 is then placed by an end effector 262 of Pick and Place (PNP) machine 260 onto a curing mandrel 238.

Preform 242 is a laminate of multiple flat charges 232 and/or full flat charge 233 formed and combined together. One or more of flat charges 232 proceed to forming machine 240 for Ply-By-Ply (PBP) forming and placement as part of preform 242. The shaping or forming of flat charges 232 or full flat charge 233 are performed by drape forming, stamp forming, ply-by-ply forming or other suitable forming methods by forming machine 240. Fabricating the preforms 242 comprises dispensing tows of fiber reinforced material that form a flat charge 232, combining multiple flat charges 232 together into a laminate 235 to form a full flat charge 233, and shaping the full flat charge 233 into a preform 242 having a desired cross-sectional shape. The forming machine 240 shapes the flat charge 232 for placement upon curing mandrel 238 as part of creating a preform 242 which is hardened into a spar segment 112, 114, 116 within an autoclave 250 after application of a vacuum bag 252 and potentially a caul plate 253. Other alternatives have a combined vacuum bag and caul plate (not shown). Preforms for splice doublers 340 (shown in FIG. 3) are provided from a splice doubler feeder line 244. Preforms for splice doublers 340 can also be referred to as splice doubler preforms.

In one non-illustrated embodiment, the vacuum bag 252 covers the preforms 242 for multiple spar segments 112, 114, 116, and the entire assembly is co-cured. In this manner, preforms 242 are assembled together with preforms for splice doublers 340 and are hardened in the autoclave 250 into a spar detail 110 in FIG. 1 for integration with a rib 290 and a wing skin 292. Preforms for splice doublers 340 are assembled for Just-in-Time (JIT) delivery for assembly together with preforms 242.

As illustrated, spar segments 112, 114, 116 are hardened at autoclave 250 from preforms 242. Multiple spar segments 112, 114, 116 are then arranged in end-to end alignment to each other. Multiple spar segments 112, 114, 116 are combined with splice doublers 340, and assembled together with fasteners to form the spar details 110. The spar segments 112, 114, 116 are then assembled together via segment splicer 280 in the form of the operations of a fastener install station 272. In this embodiment, the fastener install station 272 includes a jig 276 that holds spar segments 112, 114, 116 and hardened splice doublers 340 in relation to each other, and an end effector 274 that installs fasteners 278 through these components. That is, the end effector 274 drills installation holes and drives fasteners 278 (e.g., lockbolts) to join the splice doublers 340 and spar segments 112, 114, 116. In this embodiment, fasteners 278 are driven through splice doubler 340 and spar segments 112, 114, 116 to form an integral spar detail 110. Hardened splice doublers 340 are assembled for Just-in-Time delivery for assembly together with multiple spar segments 112, 114, 116.

Preforms 242 are hardened separately into spar segments 112, 114, 116 via autoclave 250, then arranged in end-to end (in series) alignment to each other. An end effector 271 places preforms for splice doublers 340 at splice regions 341, 341-1 (FIG. 1A) between spar segments 112, 114, 116. A press clave 270 is then used at least in part for a segment splicer 280 to co-bond the preforms for the splice doublers 340 to the spar segments 112, 114, 116 in order to form a completed spar detail 110. The press clave 270 hardens one or more of splice doublers 340 into place at intersections between spar segments 112, 114, 116 via the application of heat and pressure.

A combination of the press clave 270 process and the fastener 278 joined spar segments 112, 114, 116 are also an alternative. The press clave 270 process would precede the fastener installation process.

The operations of system 200 are managed by server 220, which comprises a memory 222 and a controller 224. In one embodiment, controller 224 is implemented as custom circuitry, as a hardware processor executing programmed instructions stored in memory 222, or some combination thereof.

The system 200 is capable of fabrication of several sets of spar segments 112, 114, 116 for multiple spar details 110 at the same time. The system 200 is broken into several spheres of fabrication with each capable of independently fabricating a set of spar segments 112, 114, 116 that eventually are combined into a spar detail 110. Therefore, hardening the preforms 242 for the spar segments 112, 114, 116 is performed while the upstream preforms 242 are assembled together from flat charge 232, full flat charge 233 and forming machine 240. This causes assembly of the spar segments 112, 114, 116 to be performed at the same time (in parallel) as the hardening within autoclave 250 of an upstream set of spar segments 112, 114, 116. A post hardening splicing, by segment splicer 280, of a still further upstream set of spar segments 112, 114 and 116 is formed into another spar detail 110. The various upstream and downstream spar segments 112, 114, 116 are typically in sets for front spars 110-2 and aft spars 110-1 and/or right and left spars.

Figure 3:
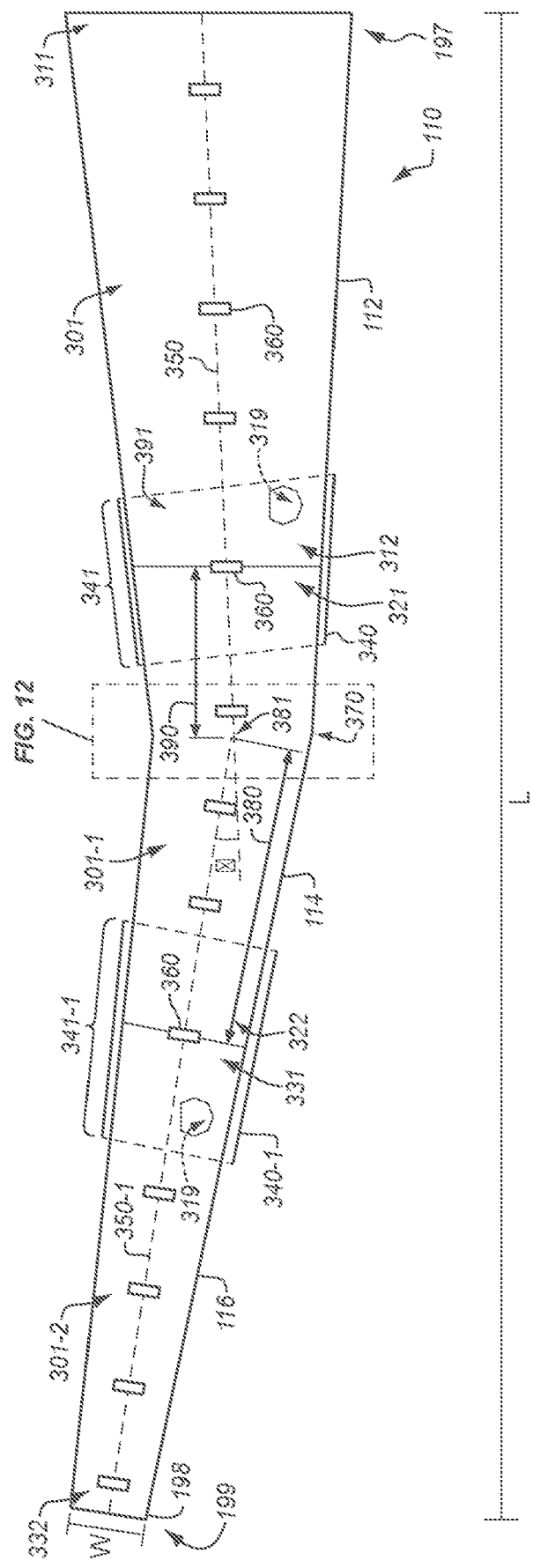
FIG. 3 is a diagram depicting a spar detail formed from multiple spar segments in an illustrative embodiment.

FIG. 3 is a diagram depicting a spar detail 110 (having a width W that tapers from an inboard end 197 to an outboard end 199, and also having a length L) formed from a first spar segment 112, a second spar segment 114, and a third spar segment 116 in an illustrative embodiment. The first spar segment 112 comprises fiber reinforced material 301, the second spar segment 114 comprises fiber reinforced material 301-1 and is disposed in series with the first spar segment 112. The first spar segment 112 has inboard end 311 and outboard end 312. The outboard end 312 of the first spar segment 112 is arranged end-to-end with the inboard end 321 of second spar segment 114. The second spar segment 114 has inboard end 321 and outboard end 322. A splice doubler 340 covers a splice region 341 including outboard end 312 and inboard end 321 (also known as an "intersection," or "splice zone") and is placed in the splice region 341 between the first spar segment 112 and the second spar segment 114. Depending on embodiment, the splice region 341 may be implemented as a butt splice, scarf splice, lap splice, or other splice of the web and flanges for the outboard end 312 of the first spar segment 112 and the inboard end 321 of the second spar segment 114 with the splice doubler 340 completing the splice. In a similar fashion, the third spar segment 116 comprises fiber reinforced material 301-2 and is disposed in series with the second spar segment 114. The outboard end 322 of the second spar segment 114 is arranged end-to-end with the inboard end 331 of third spar segment 116. The third spar segment 116 has inboard end 331 and outboard end 332. Another splice doubler 340-1 covers a splice region 341-1 between the outboard end 322 of the second spar segment 114 and the inboard end 331 of third spar segment 116. In one embodiment, adhesive 319 (e.g., an epoxy, a thermoset resin, etc.) is used to bond the splice doubler 340, first spar segment 112, and second spar segment 114 into an integral composite part. Depending on embodiment, the splice region 341 may be implemented as a butt splice, scarf splice, lap splice, or other splice of the web and flanges of the outboard end 322 of the second spar segment 114 and the inboard end 331 of the third spar segment 116 with splice doubler 340-1 added to complete the splice. In such an embodiment, the adhesive 319 may also bond the other splice doubler 340-1, second spar segment 114, and third spar segment 116 into a spar detail 110. In further embodiments, these components are fastened together, fastened and bonded, co-cured, or co-bonded together.

In FIG. 3, one of the spar segments (specifically the second spar segment 114) entirely contains a kink 370, although in further embodiments the kinks 370 are distributed across the splice regions 341, multiple kinks (multiple kinks not shown) are each contained entirely within a spar segment 114, or each of multiple spar segments such as spar segment 112, spar segment 114, and spar segment 116 entirely contains a kink 370. Each kink 370 comprises an inflection point 381 where there is an intersection of a first neutral axis 350 and a second neutral axis 350-1 of the spar detail 110. In one embodiment the change is indicated by an inflection angle θ between two and ten degrees. In one illustrative example, the kink 370 comprises a change in axial direction of the spar detail 110. In some illustrative examples, the change in axial direction is between two and ten degrees. In one embodiment, kink 370 is separated 380 from outboard neutral axis endpoint (outboard end 322) and separated 390 from inboard neutral axis endpoint (inboard end 321) of a spar segment 114 by more than one foot. In one illustrative example, the kink 370 is separated from an end of the second spar segment 114 by more than one foot. In a further embodiment, flat charges 232 (or resulting preforms 242) in FIG. 2 are prepared such that they entirely contain a kink 370 prior to hardening into a spar segment 114. In one embodiment, the kink 370 is disposed at a splice region 341, and ribs 290 (not shown) are also disposed at the splice region 341 to enhance the structural strength of the spar detail 110. In some illustrative examples, the first spar segment 112 comprises a kink 370 outside of the splice region 341.

Each spar segment 112, 114, and 116 exhibits a different shape in order to account for reductions in thickness and/or inflection angle θ of kinks 370 in accordance with design parameters. FIG. 3 further depicts that splice doublers 340 facilitate the integration of spar segments 112, 114, and 116 into the spar detail 110. Rib intersections 360 are disposed at and/or between the splice doublers 340, 340-1, and receive ribs 290 which further support the splice region 341, 341-1. Rib intersections 360 are illustrated as a small rectangular box, which is not intended to imply that the complex coupling of the rib 290 to the spar detail 110 is limited to this relatively small region. In one embodiment, the rib intersections 360 are disposed on the spar detail 110 opposite the splice doublers 340, as illustrated on an opposite side 391 as the side on which the splice doublers 340 are installed. Thus, the splice doublers 340 are installed on the side of the spar detail 110, which is not visible from this view, while the ribs 290 are installed at rib intersections 360 at side 391 of the spar detail 110, which is visible. In some illustrative examples, the splice doubler 340 is located across a rib intersection 360.

Spar details 110 assembled from individual spar segments 112, 114, and 116 provide substantial benefits over prior implementations, because they reduce the size and complexity of machinery needed in order to fabricate spar details 110. Also the spar segments 112, 114, and 116 are advantageously fabricated in parallel thus substantially reducing fabrication time and increasing work density. This results in a technical benefit of reduced cost as well as saving space on the factory floor, thereby also increasing work density. With a discussion provided above of spar details 110 and systems for fabricating such, the following FIGS. 4-8 describe various methods of fabricating the spar details 110.

Illustrative details of the operation of system 200 will be discussed with regard to FIG. 4. Assume, for this embodiment, that the components of system 200 await activation in order to fabricate spar segments for assembly into one or more spars 110.

Figure 4:
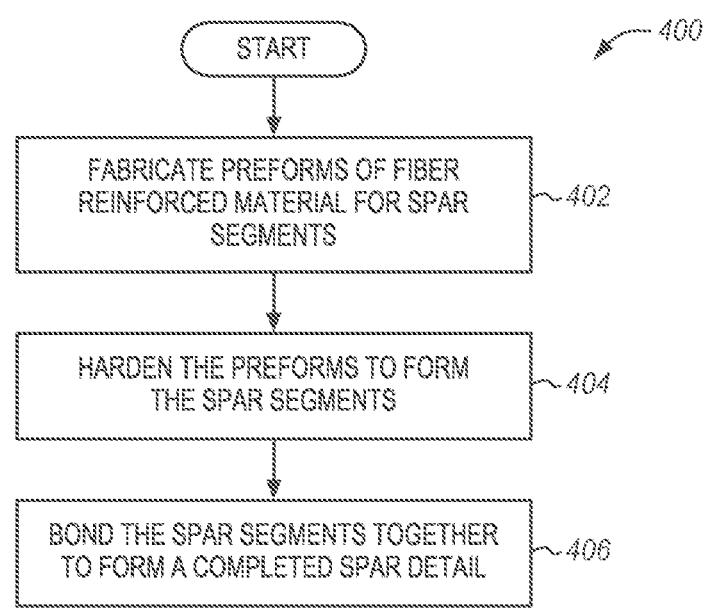
FIG. 4 is a flowchart illustrating a method for fabricating a spar detail from spar segments via co-bonding in an illustrative embodiment.

FIG. 4 is a flowchart illustrating a method 400 for fabricating a spar detail 110 from spar segments 112, 114, and 116 via co-bonding in an illustrative embodiment. The steps of method 400 are described with reference to system 200 of FIG. 2, but those skilled in the art will appreciate that method 400 may be performed in other systems. The steps of the flowcharts described herein are not all inclusive and may include other steps not shown. The steps described herein may also be performed in an alternative order.

Placement machine 230, together with forming machine 240, fabricates 402 preforms 242 of fiber reinforced material (e.g., CFRP) for spar segments 112, 114, and 116. In one embodiment, fabricating 402 the preforms 242 comprises placement machine 230 laying up one or more flat charges 232. The flat charges 232 are used directly to create the preform 242 or combined together into a full flat charge 233 and then used to create the preform 242. Flat charges 232 and/or full flat charge 233 are later formed by forming machine 240 and then placed into preforms 242 having a desired cross section. In further embodiment, not illustrated, fabricating the preforms 242 comprises laying up tows of fiber reinforced material onto a curing mandrel 238 that defines a shape for a preform 242. In a still further embodiment, fabricating the preforms 242 comprises dispensing tows of fiber reinforced material that form a flat charge 232, and forming the flat charge 232 prior to placing it during creation of preform 242 having a desired cross-sectional shape.

The preforms 242 are hardened 404 to form the spar segments 112, 114, and 116. In one embodiment, hardening 404 of the preforms 242 comprises consolidating and solidifying thermoplastic resin, while in further embodiments hardening 404 comprises heating thermoset resin to a curing temperature while under consolidation pressure in an autoclave 250. In either embodiment, the resulting spar segments 112, 114, 116 comprise hardened fiber reinforced material shaped in accordance with design parameters for specific lengthwise portions 127 of a spar detail 110.

The spar segments 112, 114, and 116 are bonded 406 together to form spar detail 110 with the outboard end 312 butted or spliced to the inboard end 321 and with the outboard end 322 butted or spliced to the inboard end 331. In one embodiment, this comprises applying an adhesive 319 or resin to the spar segments 112, 114, and 116, and forming a splice between the spar segments 110 in a splice region 341 (as depicted in FIG. 3). In a further embodiment, this comprises placing an unhardened "green" splice doubler 340 within splice region 341 between spar segments 114 and 112, and hardening the splice doubler 340 via co-bonding in the press clave 270. This operation makes the splice doubler 340 and the spar segments 114 and 112 integral, forming a spliced first spar segment 112 and second spar segment 114. Thus, in one embodiment, bonding 406 the spar segments 112 and 114 together comprises applying a splice doubler 340 that partly covers a first spar segment 112 and a second spar segment 114, followed by bonding 406 the splice doubler 340 to the first spar segment 112 and the second spar segment 114. In some embodiments, the splice doubler 340 is placed in a position where the splice doubler 340 extends across a rib intersection 360 for the spar detail 110, in order to enhance splicing. Thus, in one embodiment, applying the splice doubler 340 comprises sandwiching the first spar segment 112 and the second spar segment 114 between the fore splice doubler 340 and an aft splice doubler (not shown). In these illustrative examples, a splice doubler 340 comprises one of a fore splice doubler and an aft splice doubler, the spar further comprises the other of the fore splice doubler and the aft splice doubler, and the splice region 341 of the first spar segment 112 and the first splice region 341 of the second spar segment 114 are sandwiched between the fore splice doubler and the aft splice doubler. In some illustrative examples, the splice doubler 340 sandwiches a portion of the first spar segment 112 and a portion of the second spar segment 114 between the splice doubler 340 and one of a second splice doubler or a rib 290.

In another embodiment, applying the splice doubler 340 comprises sandwiching the first spar segment 112 and the second spar segment 114 between the splice doubler 340 and a rib 290. In these illustrative examples, the splice region of the first spar segment and the first splice region of the second spar segment are sandwiched between the splice doubler and a rib. Similarly, second spar segment 114 and third spar segment 116 are spliced together using splice doubler 340 and or rib 290 as spliced together in a manner like that used to splice first spar segment 112 to second spar segment 114 as discussed above thus resulting in spar detail 110.

After completion, the spar detail 110 is assembled together with additional details to form a completed spar like aft spar 110-1 and front spar 110-2 of FIG. 9. Method 400 provides a substantial benefit over prior systems, because it enables a spar detail 110 to be formed via co-bonding from a series of smaller individual spar segments 112, 114, and 116 which each occupy a fraction of the overall length of the spar detail 110. This reduces fabrication complexity and time. Furthermore, if rework on a single spar segment 112, 114, and 116 is warranted, the rework may be performed on a single spar segment 112, 114, and 116, instead of the entire spar detail 110.

Figure 5:
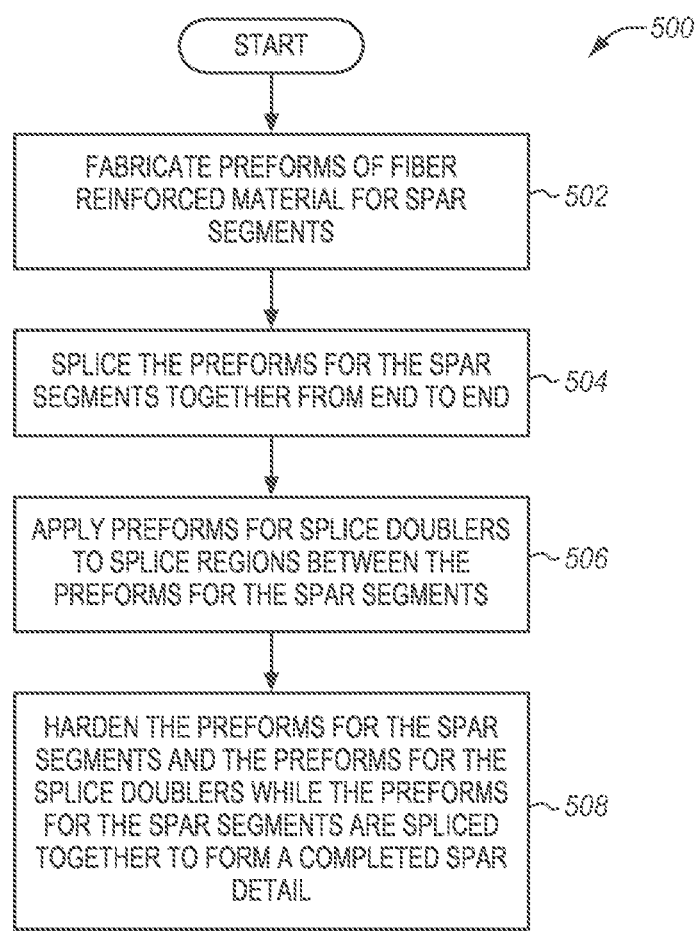
FIG. 5 is a flowchart illustrating a further method for fabricating a spar detail from spar segments via co-curing in an illustrative embodiment.

FIG. 5 is a flowchart illustrating a further method 500 for fabricating a spar detail 110 from spar segments 112, 114, and 116 via co-curing in an illustrative embodiment. According to method 500, preforms 242 of fiber reinforced material are fabricated 502 for spar segments 112, 114, and 116, and may be accomplished in a similar manner to the fabricating 402 step described above. In some illustrative examples, prior to co-curing, the first spar segment 112, the second spar segment 114, the third spar segment 116, the splice doubler 340 and the second splice doubler 340-1 comprise a dry fiber that is infused in place with a resin prior to the co-curing. As a part of this fabrication process, the preforms 242 may include ramps, stair-step patterns, a scarf type splice of complementary features of preforms 242 within a splice region 341. The outboard end 312 butted or spliced to the inboard end 321 within splice region 341. The outboard end 322 butted or spliced to the inboard end 331 within splice region 341-1. In one embodiment, fabricating 502 the preforms 242 comprises dispensing/laying up tows of fiber reinforced material that form a flat charge 232, and shaping the flat charge 232 into a preform 242 having a desired cross-sectional shape. In a further embodiment, laying up the preforms 242 includes combining multiple flat charges 232 together into a full flat charge 233, and shaping the full flat charge 233 into a preform 242 having a desired cross-sectional shape.

The preforms 242 for the spar segments 112 and 114 are spliced 504 together with the outboard end 312 of the first spar segment 112 arranged end-to-end with the inboard spar segment 114. In other words, the spar segments 112 and 114 are arranged in series. In one embodiment, splicing 504 the preforms 242 for the spar segments 112 and 114 is performed by lap splices, butt splices, and/or scarf splices of complementary ramps or patterns of preforms within a splice region 341. The preforms 242 for the spar segments 114 and 116 are spliced 504 together with the outboard end 322 of the first spar segment 112 arranged end-to-end with the inboard end 331 of the spar segment 116. In one embodiment, splicing 504 the preforms 242 for the spar segments 114 and 116 is performed by lap splices, butt splices and/or scarf splices of complementary ramps or patterns of preforms 242 within a splice region 341-1. In further embodiments, splicing 504 the preforms 242 for the spar segments 114 and 116 is performed by arranging dry fiber preforms together, and then infusing the preforms 242 with resin.

Next, a PNP machine 260 applies 506 preforms for splice doublers 340 to splice regions between the preforms 242 for the spar segments 112 and 114. In one embodiment, this operation comprises placing unhardened preforms for splice doublers 340 in splice regions 341 that form splices between preforms 242 for spar segments 112 and 114. In another embodiment, applying 506 a preform for a splice doubler 340 comprises picking up and placing the preform for the splice doubler 340 in a position where the preforms for splice doubler 340 extends across a rib intersection 360 for the spar detail 110. In a further embodiment, applying 506 the preform for the splice doubler 340 comprises laying up the preform (not shown) for the splice doubler 340 in a position where the preform for the splice doubler 340 extends across a rib intersection 360 for the spar detail 110. In one embodiment, applying 506 the preform (not shown) for the splice doubler 340 comprises laying up the preform for the splice doubler 340 spanning across outboard end 312 and inboard end 321 and across an opposite side of the spar detail 110 from a rib intersection 360 for the spar detail 110. In this manner, the rib intersection 360 is disposed on the spar detail 110 opposite the splice doubler 340. In addition, applying the preform (not shown) for the splice doubler 340-1 comprises laying up the preform for the splice doubler 340-1 spanning across outboard end 312 and inboard end 321 and placed on an opposite side of the spar detail 110 from a rib intersection 360 for the spar detail 110. Similarly, the rib intersection 360 is disposed on the spar detail 110 opposite the splice doubler 340-1.

An autoclave 250 hardens 508 the preforms 242 for the spar segments 112 and 114 and the preforms for the splice doublers 340, 340-1 while the preforms 242 for the spar segments 112, 114 and 116 are spliced 504 together, in order to form a completed spar detail 110. In a further embodiment, hardening 508 the preforms 242 for the spar segments 112, 114 and 116 and the preforms for the splice doublers 340, 340-1 comprises vacuum bagging the preforms 242 for the spar segments 112, 114 and 116 and the preforms for the splice doublers 340, 340-1. The preforms 242 for the spar segments 112, 114 and 116 and the preforms for the splice doublers 340, 340-1 are consolidated via the vacuum compaction, and heating the preforms 242 for the spar segments 112, 114 and 116 and the preforms for the splice doublers 340 to a curing temperature or consolidation temperature. Thus, in one embodiment, the vacuum bag 252 additionally covers the preform 242 for a third spar segment 116 and a preform for the second splice doubler 340, 340-1.

Figure 6:
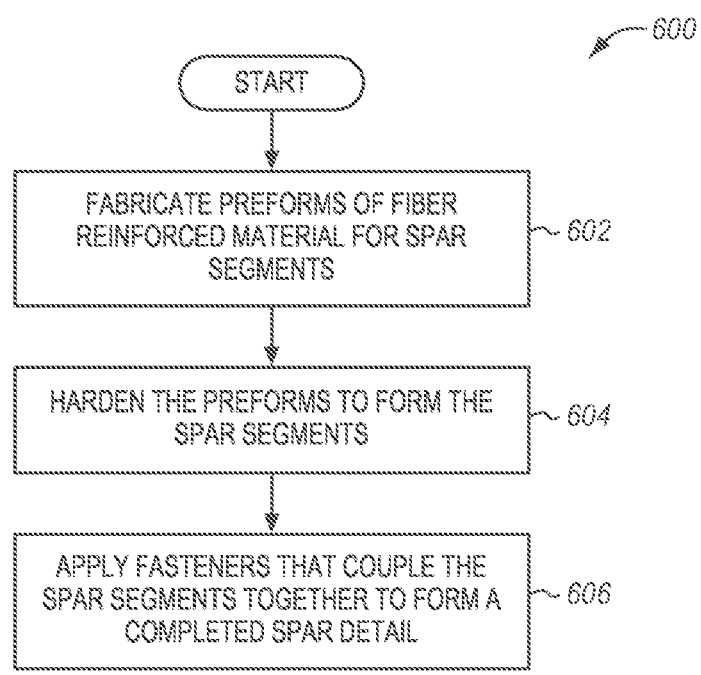
FIG. 6 is a flowchart illustrating a further method for fabricating a spar detail from spar segments via fasteners in an illustrative embodiment.

FIG. 6 is a flowchart illustrating a further method 600 for fabricating a spar detail 110 from spar segments 112, 114, and 116 via fasteners in an illustrative embodiment. A placement machine 230 and/or forming machine 240 fabricates 602 preforms 242 of fiber reinforced material for spar segments 112, 114, and 116. Fabrication 602 may be performed in a similar manner to the fabrication 402 step in FIG. 4 discussed above. In one embodiment, fabricating 602 the preforms 242 comprises dispensing tows of fiber reinforced material that form a flat charge 232, and shaping the flat charge 232 into a preform 242 having a desired cross-sectional shape. In a further embodiment, fabricating 602 the preforms 242 comprises dispensing tows of fiber reinforced material that form a flat charge 232, combining multiple flat charges 232 together into a laminate 235 to form a full flat charge 233, and shaping the full flat charge 233 into a preform 242 having a desired cross-sectional shape. Embodiments may include the utilization of dry fiber and resin infusion as described elsewhere herein.

The preforms 242 are hardened 604 to form the spar segments 112, 114, and 116. In one embodiment, this comprises operating an autoclave 250 to harden 604 the preforms 242 into individual ones of spar segments 112, 114, and 116. At this point in time, the spar segments 112, 114, and 116 remain physically separated from each other. In a further embodiment, splice doublers 340, 340-1 are utilized and are fastened to each spar segment 112, 114, and 116 to form a splice.

Jig 276 of fastener install station 272 holds spar segments 112 and 114 and additionally 114 and 116, and hardened splice doublers 340, 340-1 in splice regions 341, 341-1, respectively. End effector 274 installs fasteners to join these components into spar detail 110. Specifically, the end effector 274 applies 606 fasteners that couple the spar segments 112 to 114 and 114 to 116 together to form a completed spar detail 110. In one embodiment, applying 606 fasteners comprises applying a splice doubler 340, 340-1 that partly covers the outboard end 312 and the inboard end 321, and installing fasteners through the splice doubler 340 and through the first spar segment 112 and the second spar segment 114. Applying 606 fasteners to a splice doubler 340-1 that partly covers the outboard end 322 and the inboard end 331, and installing fasteners through the splice doubler 340-1 and through the first spar segment 112 and the second spar segment 114. In a further embodiment, applying the splice doubler 340 comprises placing the splice doubler 340 in a position where the splice doubler 340 extends across a rib intersection 360 in splice region 341, 341-1 for the spar detail 110. In one embodiment, applying 606 the fasteners for the splice doubler 340 comprises placing the splice doubler 340 spanning across outboard end 312 and inboard end 321 and across an opposite side of the spar detail 110 from a rib intersection 360 for the spar detail 110. In this manner, the rib intersection 360 is disposed on the spar detail 110 opposite the splice doubler 340. After assembly, the spar detail 110 is combined with other details into a spar 110-1, 110-2 (FIG. 9). In this manner, the fastener install station 272 assembles the splice doublers 340, 340-1 and spar segments 112, 114, and 116 into a single integral spar detail 110.

Figure 7:
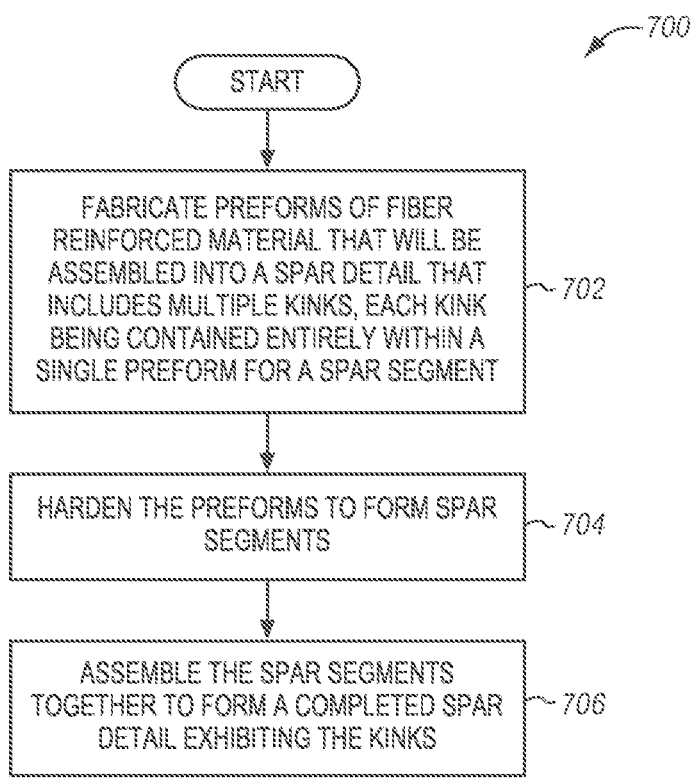
FIG. 7 is a flowchart illustrating a method for fabricating a spar detail having kinks in an illustrative embodiment.

FIG. 7 is a flowchart illustrating a method 700 for fabricating a spar detail 110 having one or more kinks 370 in an illustrative embodiment. Method 700 includes laying up, or fabricating 702, preforms 242 of fiber reinforced material that will be assembled into a spar detail 110 that includes one or more kinks 370. Each kink 370 is contained entirely within a single preform 242 for a spar segment 112, 114, and 116, such as spar segment 112, 114, 116. In one embodiment, fabricating 702 the preforms 242 comprises changing the direction from a first neutral axis 350 to a second neutral axis 350-1 of a preform 242 at each kink 370 (e.g., during layup or forming), wherein the change is between two and ten degrees. In a further embodiment, fabricating 702 the preforms 242 comprises placing each kink 370 at least one foot from outboard end 322 and inboard end 321 of a preform 242 for a spar segment 114. Likewise, placement of a kink 370 in spar segment 112 and/or spar segment 114 are also contemplated. In a still further embodiment, laying up (i.e., fabricating 702) the preforms 242 comprises laying up flat charges 232 on mandrel 234, followed by shaping the flat charges 232 on a rigid tool such as curing mandrel 238. The shaping or forming of flat charges 232 or full flat charge 233 are performed by drape forming, stamp forming, ply-by-ply forming or other suitable forming methods prior to incorporation into preform 242.

The preforms 242 are hardened 704 to form the spar segments 112, 114, and 116, which are then assembled 706 together to form a completed spar detail 110 exhibiting the kinks 370. The assembly process may be performed via co-curing, co-bonding, or via fasteners or a combination of fasteners and bonding or co-bonding as discussed above. In one embodiment, hardening 704 the preforms 242 for the spar segments 112, 114 and 116 is performed while the upstream preforms 242 are assembled together from flat charge 232, full flat charge 233 and forming machine 240, causing assembly of the spar segments 112, 114 and 116 to be performed at the same time as the hardening 704 within autoclave 250 of an upstream set of spar segments 112, 114 and 116 and a post hardening splicing, by segment splicer 280, of a still further upstream set of spar segments 112, 114 and 116 into spar detail 110. The upstream and downstream spar segments are typically in sets for front spars 110-2 and aft spars 110-1 and/or right and left spars.

The spar segments 112 and 114 are assembled 706 together to form a portion of completed spar detail 110 exhibiting the kinks 370. In one embodiment, assembling 706 the spar segments 112 and 114 includes applying splice doublers 340 across the outboard end 312 and the inboard end 321 to splice the spar segment 112 to spar segment 114. Assembling 706 the spar segments 114 and 116 includes applying splice doublers 340-1 across the outboard end 322 and the inboard end 331 to splice the spar segment 114 to spar segment 116. In some illustrative examples, assembling 706 the spar segments 112, 114, 116 comprises forming at least one of a lap splice, a butt splice and a scarf splice between adjacent ends of the spar segments 112, 114, 116; and attaching the splice doublers 340, 340-1 to the splice regions 341, 341-1 using one of co-curing, co-bonding, and fasteners. In some illustrative examples, assembling 706 the spar segments 112, 114, 116 comprises arranging the spar segments 112, 114, 116 in series alignment to each other to form splice regions 341, 341-1 and applying splice doublers 340, 340-1 to the spar segments 112, 114, 116 within the splice regions 341, 341-1.

Figure 8:
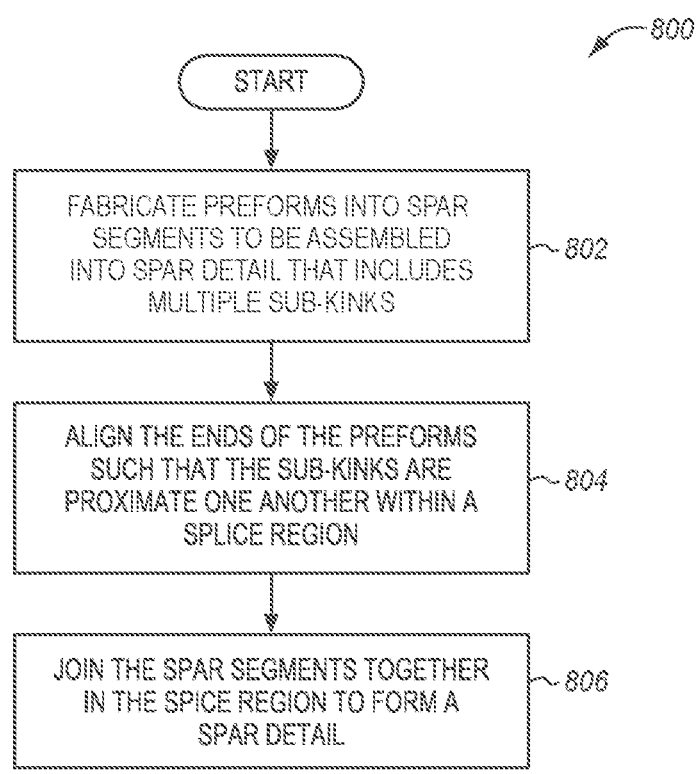
FIG. 8 is a flowchart illustrating a further method for fabricating a spar detail having kinks in an illustrative embodiment.

While a single kink 370 may be implemented in certain applications, in other applications, a single kink 370 might result in an angle between the two neutral axes that is too large to be fabricated with known CFRP fabrication methods. To that end, FIG. 8 is a flowchart illustrating a further method 800 for fabricating a spar detail 110 having kinks. In the embodiment shown in method 800, multiple kinks are incorporated, in relatively close proximity to one another, across adjacent spar segments (e.g., spar segments 112 and 114) to more smoothly transition the change in neutral axes between adjacent spar segments 112, 114. In such an embodiment, and for clarity, the multiple kinks are referred to herein as sub-kinks 371, 371-1 and are illustrated in FIG. 13.

In some illustrative examples, fabricating 702 the preforms 242 comprises changing an axial direction of the preform 242 at each kink 370. In some illustrative examples, fabricating 702 the preforms 242 comprises changing an axial direction of the preform 242 at each kink 370, the change in axial direction being an inflection angle between two and ten degrees. In some illustrative examples, each preform 242 includes a first end and a second end opposite the first end and fabricating 702 the preforms 242 comprises placing each kink 370 at least one foot from an end of the preform 242.

According to FIG. 8, preforms 242 of fiber reinforced material are fabricated 802 into spar segments 112, 114, 116 that will be assembled into a spar detail 110 that includes multiple sub-kinks 371, 371-1. For example, adjoining ends of a spar segment 112 and a spar segment 114 might each incorporate a sub-kink, e.g., 371, 371-1, and each sub-kink 371, 371-1 changes the direction from a first neutral axis 350 to a second neutral axis 350-1 of a preform 242 of the spar detail 110. Fabricating 802 the preforms 242 may be performed as described above for the foregoing methods.

Figure 13:
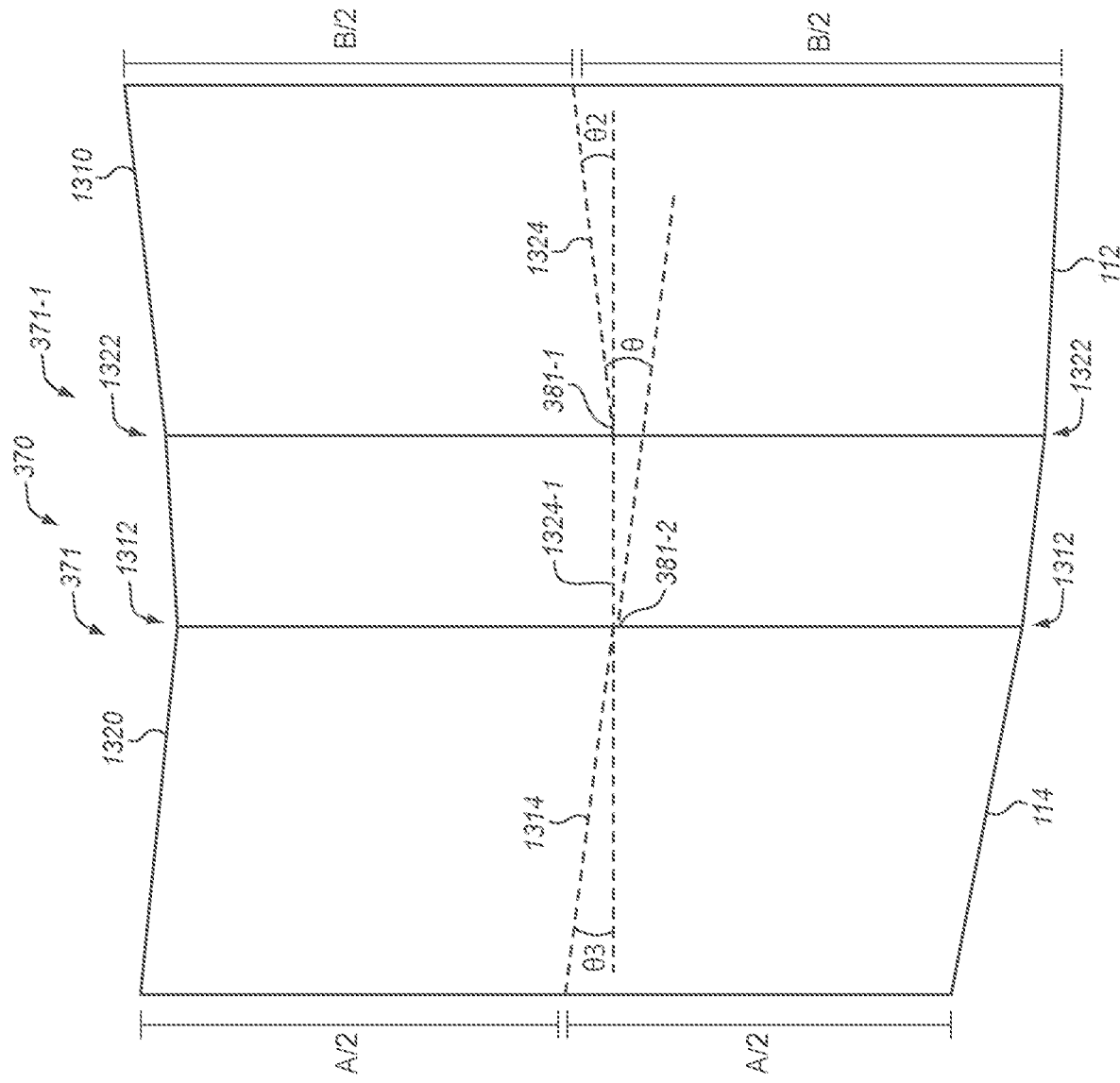
FIGS. 13-14 depict assembly of a kink that has been subdivided into bends in an illustrative embodiment.

The ends of the preforms 242 with the sub-kinks 371, 371-1 (e.g., spar segments 112, 114) are aligned 804 such that the sub-kinks 371, 371-1 are proximate one another within a splice region, which is described further with respect to FIG. 13. Spar segments 112 and 114 are then joined 806 together within the splice region. Aligning 804 and joining 806 the ends comprises overlapping, butt splicing, scarf splicing, or other means during creation of preform 242.

The spar detail 110 is fabricated using the preforms 242. In one embodiment, fabricating the spar detail 110 is performed via co-curing the preforms 242, co-bonding the spar segments 112, 114, and 116, fastening the spar segments 112, 114, and 116 or co-bonding and fastening the spar segments 112, 114, and 116 together as discussed above.

Figure 9A:
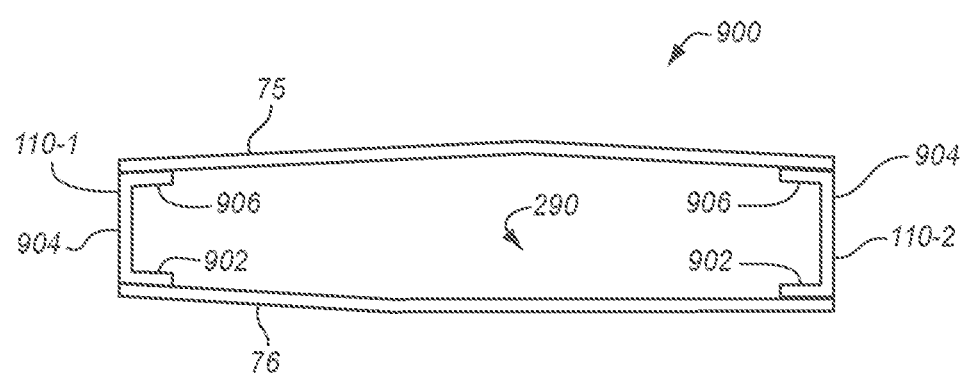
FIG. 9A depicts a cross section of a wing in an illustrative embodiment.

FIG. 9 depicts a wing 900 of an aircraft that includes spars in an illustrative embodiment. FIG. 9A depicts a cross-section of wing 900 (similar to wings 12 in FIG. 1) that corresponds with view arrows 9A of FIG. 9. Wing 900 is an illustrative embodiment of an aircraft that includes aft spar 110-1 and front spar 110-2 in an illustrative embodiment. The aft spar 110-1 and front spar 110-2 are hidden beneath a wing panel 75 (similar to panel 30 in FIG. 1), and each extend from inboard end 197 to outboard end 199 and wing tip 198, although it is possible that some spar details 110 terminate before reaching the wing tip 198 in a non-illustrated example. For example, some spar details 110 extend from a side of body intersection of an aircraft towards a wing tip 198. Front spar 110-2 and aft spar 110-1 terminate at the wing tip 198. As shown in FIG. 9A, aft spar 110-1 comprises a first flange 902 and a second flange 906 with a web 904 there between. For simplicity, front spar 110-2 also illustrates a first flange 902, a second flange 906, and web 904.

A typical wing panel 75, 76 comprises a composite wing skin and composite stringers which are attached to the wing skins and extend from inboard end 197 to outboard end 199. As will be discussed below, the wing panels 75, 76 are formed of a composite material, such as CFRP laid up in bandwidth of strips having various fiber orientations to provide the desired strength and flexibility. As shown in FIG. 9, the ribs 290 are arranged chordwise between the aft spar 110-1 and the front spar 110-2 and beneath the wing panel 75.

FIG. 9A depicts front spar 110-2 and aft spar 110-1, which are disposed between wing panels 75, 76 and are joined to rib 290. Wing panel 75 is coupled respectively to flanges 906 and rib 290 while wing panel 76 is coupled respectively to flanges 902 and rib 290 to complete the wing 900. Wing panels 75 and 76 are not shown with stringers for clarity.

Figure 11:
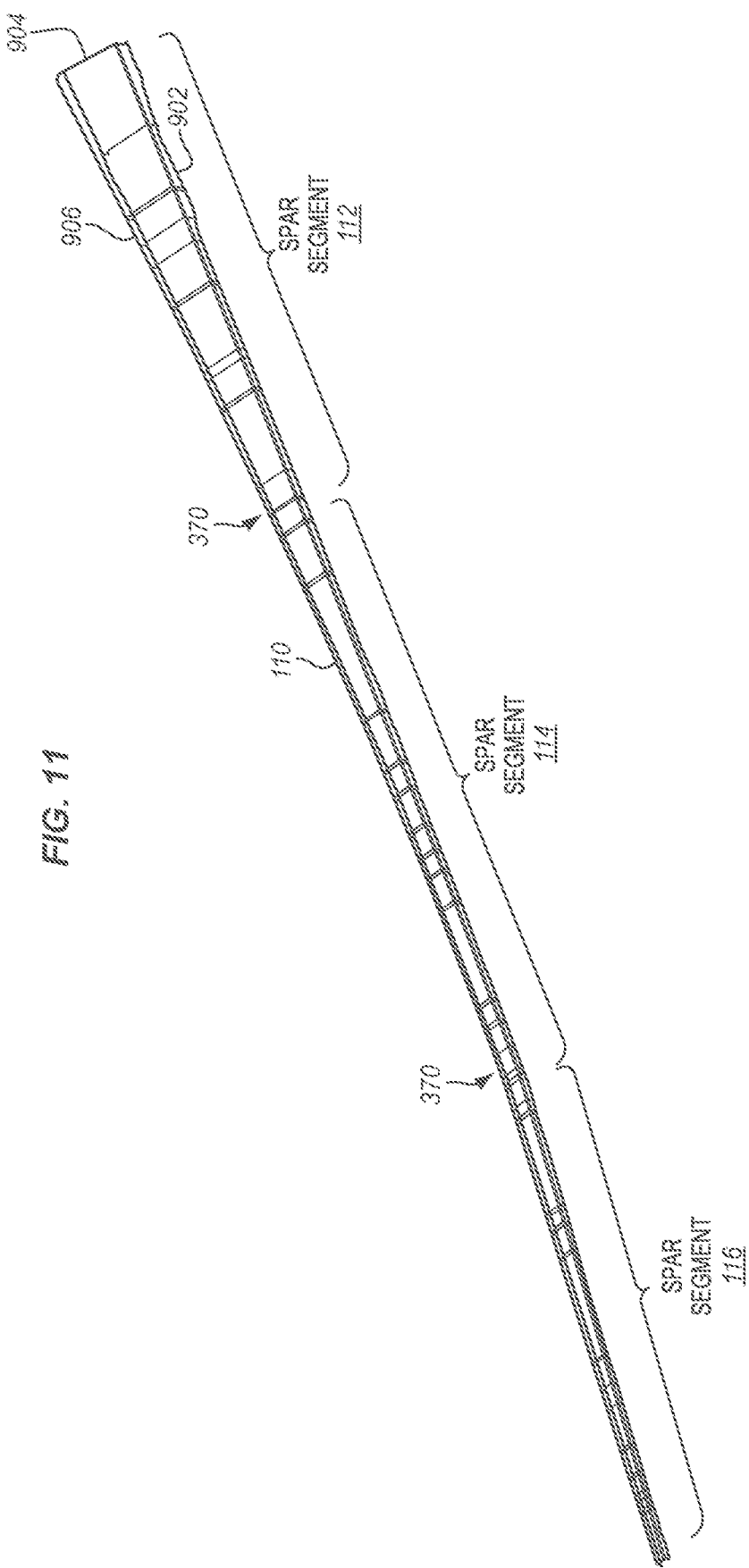

FIGS. 10-11 depict spar details 110 in an illustrative embodiment. It is representative of either aft spar 110-1 and/or front spar 110-2. FIG. 10 illustrates a first view wherein a web 904 and flange 902 are visible, while FIG. 11 illustrates a second view corresponding with view arrows 11 of FIG. 10. In FIG. 11, each flange 902 and 906 is clearly visible, as is the web 904 that couples to the flange 902 and 906. Each kink 370 comprises an inflection point 381 (shown in FIG. 12) where there is an intersection of a first neutral axis 350 and a second neutral axis 350-1 of the spar detail 110, all shown in FIG. 12.

Figure 12:
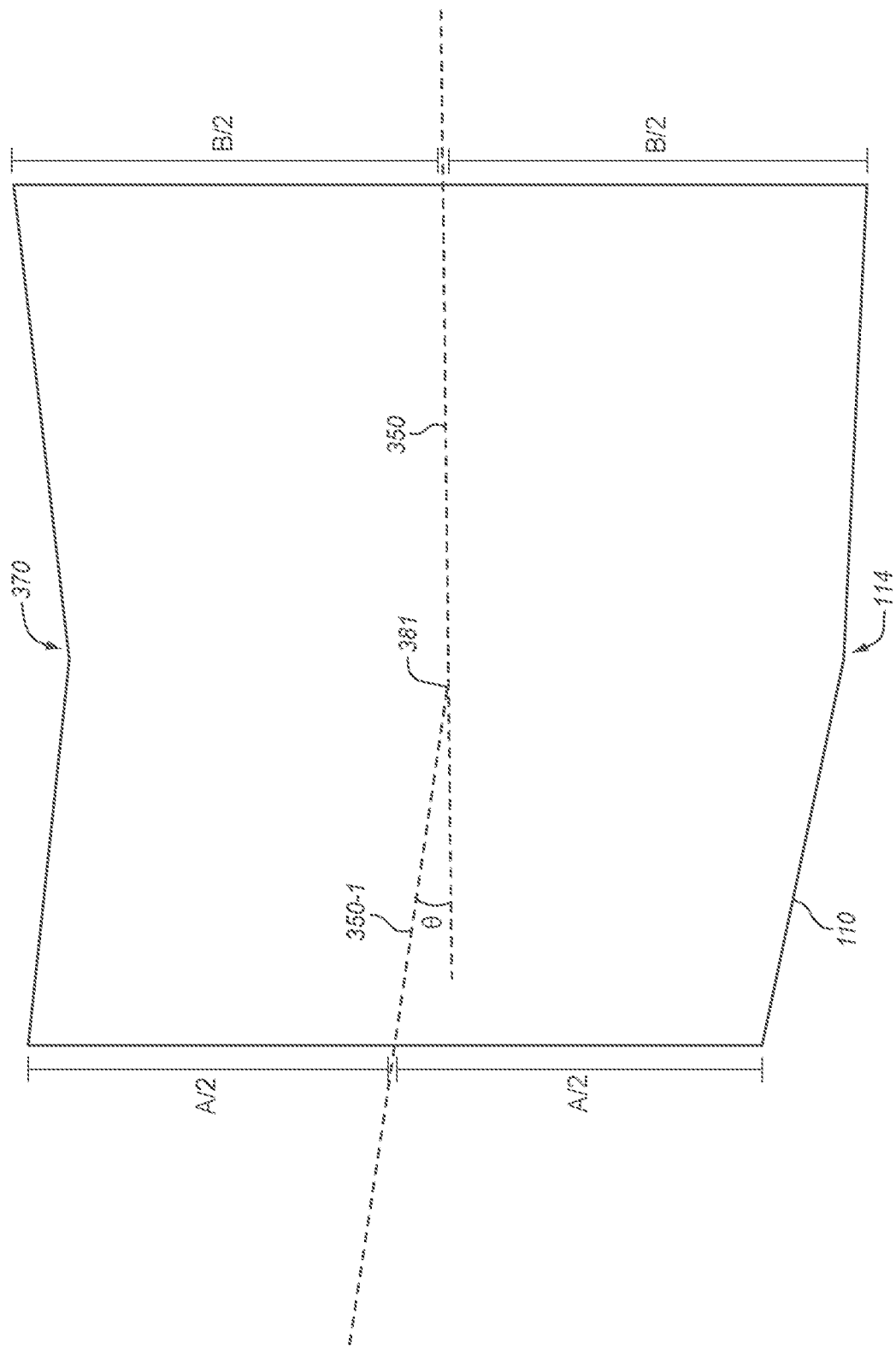
FIG. 12 depicts a kink at a portion of a spar detail in an illustrative embodiment.

FIG. 12 depicts a kink 370 at a portion of spar detail 110 in an illustrative embodiment, and corresponds with a view within the box labeled FIG. 12 of FIG. 3. The kink 370 is the result of a first neutral axis 350 (illustrated as a dash line) of the spar detail 110 being bent by an angle θ at inflection point 381 resulting in second neutral axis 350-1. The integration of a kink 370 into a spar detail 110 formed from multiple segments (not shown in FIG. 12) may complicate the assembly process. Therefore, in one embodiment, the kink 370 is entirely contained within a single spar segment 112, 114, and 116. As depicted in FIG. 12, the kink 370 is entirely contained within second spar segment 114. Because the kink 370 is entirely contained within a spar segment 112, 114, and 116, different spar segments 112, 114, and 116 in the spar detail 110 are spliced in splice regions 341 and/or 341-1 (both shown in FIG. 3) that exhibit neutral axis alignment to first neutral axis 350 and/or second neutral axis 350-1, respectively. This neutral axis alignment to first neutral axis 350 and/or second neutral axis 350-1 substantially reduces the difficulty of aligning and affixing spar segments 112, 114, and 116 together.

Figure 14:
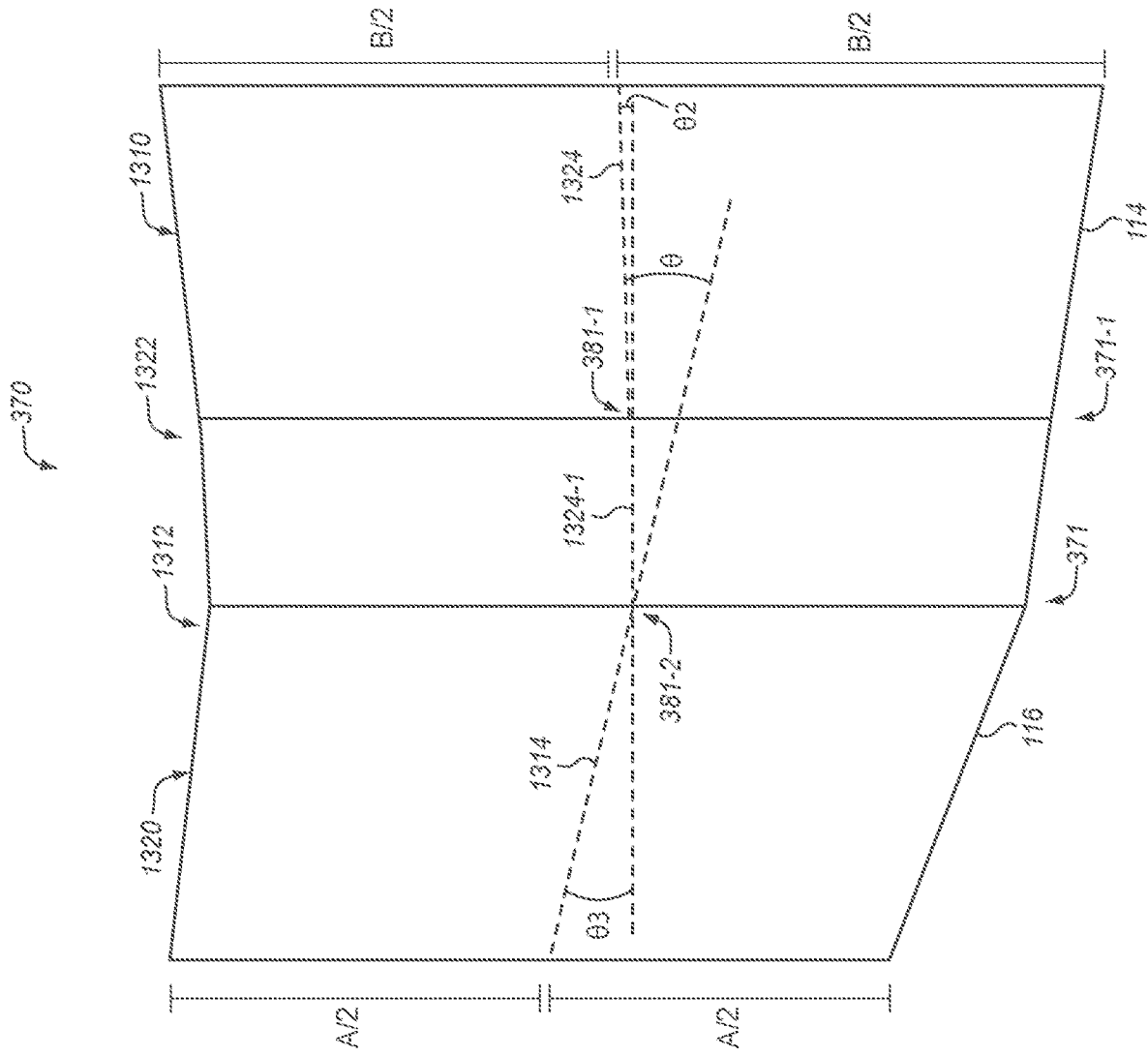

In further embodiments, as shown in FIGS. 13 and 14, a kink 370 having an angle θ is subdivided into two sub-kinks 371, 371-1 at bends 1312 and 1322 having an angular deviation of θ2 and θ3, respectively, at adjacent spar segments such as spar segments 112 and 114. At bend 1322, the first neutral axis 1324 transitions to a second neutral axis 1324-1 by an angle of θ2. The sub-kink 371-1 is the result of the first neutral axis 1324 of the spar detail 110 being bent by an angle θ2 at inflection point 381-1 resulting in second neutral axis 1324-1. At bend 1312, the second neutral axis 1324-1 transitions to a third neutral axis 1314 by an angle of θ3. The sub-kink 371 is the result of the second neutral axis 1324-1 of the spar detail 110 being bent by an angle θ3 at inflection point 381-2 resulting in third neutral axis 1314. In an embodiment, the sum of angle θ2 of sub-kink 371-1 plus angle θ3 of sub-kink 371 is equal to angle θ, which may or may not be equal to the angle θ of the single kink 370 configuration illustrated in FIG. 12.

In further embodiments, sub-kinks 371, 371-1 are distributed across additional spar segments 112, 114, 116. For example, the intersection of spar segments 112 and 114 may include two sub-kinks 371, 371-1, while the intersection of spar segments 114 and 116 may also include two sub-kinks 371, 371-1.

Thus, when the spar segments 112, 114, 116 are brought together, the assembly process may be accurately performed by aligning 804 the spar segments 112, 114, 116 together, and applying a splice doubler 340 (of FIG. 3) to secure the joining 806. The splice doubler 340 may be co-cured, co-bonded, or fastened to two of the respective spar segments 112, 114, 116.

To reiterate, in a further embodiment a first spar segment, for example spar segment 112, that comprises fiber reinforced material and includes a sub-kink 371-1 disposed at an end 1310, and a second spar segment, for example spar segment 114, also comprises fiber reinforced material, includes another sub-kink 371 disposed at an end 1320. In some illustrative examples, the sub-kink 371-1 associated with the first spar segment 112 is disposed within one foot of the end of the first spar segment 112; and the sub-kink 371 associated with the second spar segment 114 is disposed within one foot of the end of the second spar segment 114. The end 1310 is placed in series and adjacent to the end 1320 (e.g., within one foot of an end), and the spar segments 112, 114 of this example are disposed in series such that the sub-kinks 371, 371-1 taken together provide a desired amount of kink. A component (e.g., a splice doubler 340 of FIG. 3 as described above) may structurally unite the first spar segment 112 and the second spar segment 114. In some illustrative examples, the splice doubler 340 is disposed to sandwich the splice region 341 and the sub-kinks 371, 371-1 between the splice doubler 340 and a second splice doubler.

In some illustrative examples, fabricating 802 the preforms 242 comprises fabricating 802 the preforms 242 such that each sub-kink 371-1 371 has an equal angular deviation.

In some illustrative examples, fabricating 802 the preforms 242 comprises fabricating 802 the preforms 242 such that the sub-kinks 371-1, 371 have a non-equal angular deviation. In some illustrative examples, each sub-kink 371-1, 371 alters an axial direction of the spar detail 110 by one half of an amount of the kink 370.

FIG. 14 depicts an embodiment wherein a spar segment, for example spar segment 116, exhibits one bend 1312 that is different in magnitude from another bend 1322 that might be found in spar segment 114. The sum of angle θ2 of sub-kink 371-1 plus angle θ3 of sub-kink 371 is still equal to angle θ, but angle θ2 is not equal to angle θ3.

In some embodiments, sub-kinks 371, 371-1 are formed at bends 1312 and 1322 of a flat charge 232 that includes the bends 1312 and 1322 at layup. Another alternative has a forming machine shape the flat charges 232 without the sub-kinks 371-, 371-1 into preforms 242 that include sub-kinks 371, 371-1 and bends 1312 and 1322 at ends 1310 and 1320 which, in combination, form a kink of angle θ.

FIGS. 15-17 depict formation of a flat charge 232 into a preform 242 having a predefined cross-section 1702 in an illustrative embodiment. In FIG. 15, a flat charge 232 of one or more layers is formed via the application of multiple tows 1510. In FIG. 16, which corresponds with view arrows 16 in FIG. 15, a full flat charge 233 including multiple flat charges 232 is transferred to a mandrel 234 having a contour 1610. In FIG. 17, the flat charge 232 is shaped into conformance with the contour 1610 via the application of pressure and/or heat, resulting in a preform 242. Although a full flat charge 233 having multiple flat charges 232 is depicted as being shaped into conformance with the contour 1610, in some non-depicted examples, each flat charge 232 is shaped into conformance with the contour 1610 individually.

FIG. 18 depicts a scarf joint 1850 (or other overlap) between spar segments 112 and 114 in an illustrative embodiment. As shown in FIG. 18, spar segment 112 includes an end 1834 that overlaps an end 1844 of a spar segment 114. The ends overlap along ramp 1832 and ramp 1842 of the spar segments 112, 114. A ramp rate for each of the ramps 1832, 1842 may be complementary and/or equal, such that a uniform thickness is maintained across an entirety of the scarf joint 1850. End 1834 and end 1844 are depicted simply and without flanges 902, 906 for clarity. In a further embodiment, the scarf joint 1850 is one of multiple scarf joints that join multiple spar segments together into a single, integral spar detail. The scarf joint 1850 may be fabricated via co-curing, co-bonding, installation of fasteners, or other means as desired. Instead of the scarf joint 1850, a step lap joint or other suitable joint is contemplated.

EXAMPLES

In the following examples, additional processes, systems, and methods are described in the context of fabrication of spar details.

Figure 19:
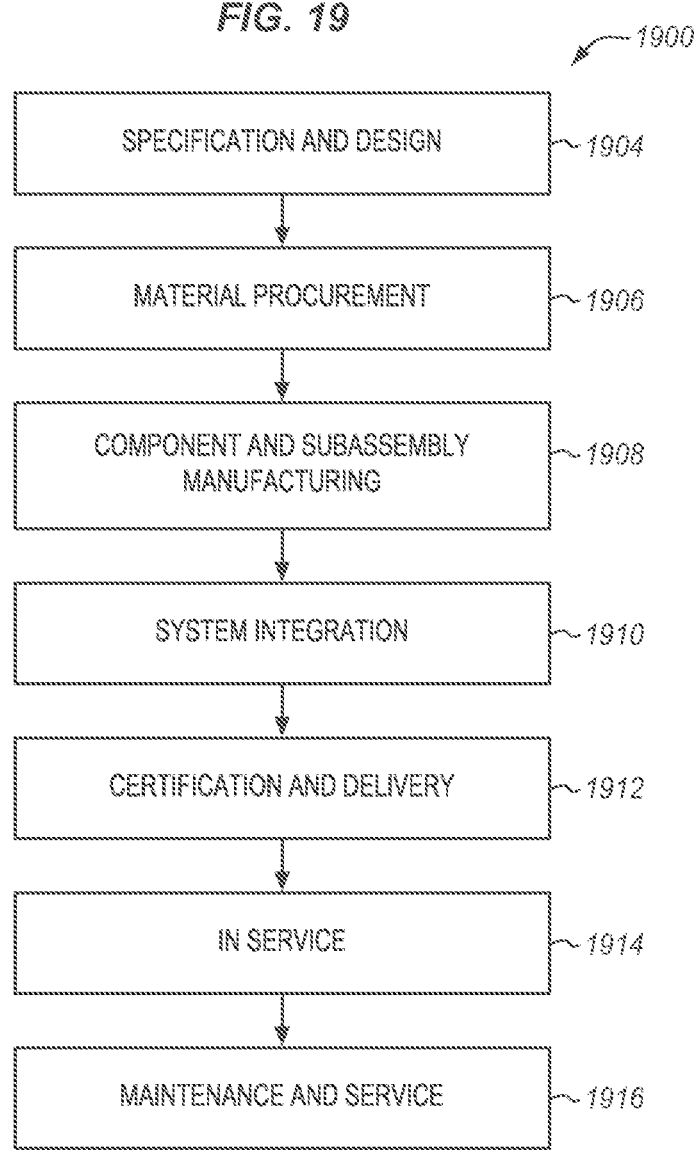
FIG. 19 is a flow diagram of aircraft production and service methodology in an illustrative embodiment.
Figure 20:
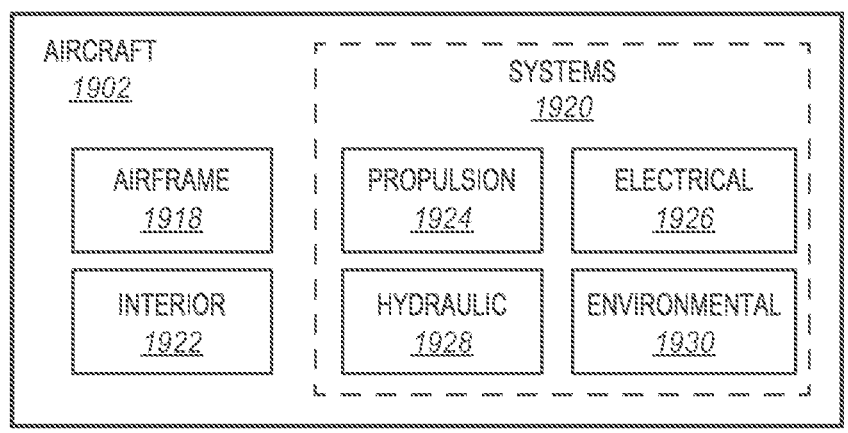
FIG. 20 is a block diagram of an aircraft in an illustrative embodiment.

Referring more particularly to the drawings, embodiments of the disclosure may be described in the context of aircraft manufacturing and service in method 1900 as shown in FIG. 19 and an aircraft 1902 as shown in FIG. 20. FIG. 19 is a flow diagram of aircraft prosecution and service methodology in an illustrative embodiment. During pre-production, method 1900 may include specification and design 1904 of the aircraft 1902 and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine work in maintenance and service 1916 (which may also include modification, reconfiguration, refurbishment, and so on). Apparatus and methods embodied herein may be employed during any one or more suitable stages of the production and service described in method 1900 (e.g., specification and design 1904, material procurement 1906, component and subassembly manufacturing 1908, system integration 1910, certification and delivery 1912, service 1914, maintenance and service 1916) and/or any suitable component of aircraft 1902 (e.g., airframe 1918, systems 1920, interior 1922, propulsion system 1924, electrical system 1926, hydraulic system 1928, environmental system 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

FIG. 20 is a block diagram of an aircraft in an illustrative embodiment. As shown in FIG. 20, the aircraft 1902 produced by method 1900 may include an airframe 1918 with a plurality of systems 1920 and an interior 1922. Examples of systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1900. For example, components or subassemblies corresponding to component and subassembly manufacturing 1908 may be fabricated or manufactured in a manner similar to components or subassemblies produced while the aircraft 1902 is in service. Also, one or more apparatus embodiments, method embodiments, or a combination thereof may be utilized during the subassembly manufacturing 1908 and system integration 1910, for example, by substantially expediting assembly of or reducing the cost of an aircraft 1902. Similarly, one or more of apparatus embodiments, method embodiments, or a combination thereof may be utilized while the aircraft 1902 is in service 1914, for example and without limitation during the maintenance and service 1916. Thus, the invention may be used in any stages discussed herein, or any combination thereof, such as specification and design 1904, material procurement 1906, component and subassembly manufacturing 1908, system integration 1910, certification and delivery 1912, service 1914, maintenance and service 1916 and/or any suitable component of aircraft 1902 (e.g., airframe 1918, systems 1920, interior 1922, propulsion system 1924, electrical system 1926, hydraulic system 1928, and/or environmental system 1930).

In one embodiment, a part comprises a portion of airframe 1918, and is manufactured during component and subassembly manufacturing 1908. The part may then be assembled into an aircraft in system integration 1910, and then be utilized in service 1914 until wear renders the part unusable. Then, in maintenance and service 1916, the part may be discarded and replaced with a newly manufactured part. Inventive components and methods may be utilized throughout component and subassembly manufacturing 1908 in order to manufacture new parts.

Further, the disclosure comprises examples according to the following clauses:

Clause 1. A method 400 for fabricating a spar detail 110 for an aircraft 10, the method 400 comprising: fabricating 402 preforms 242 of fiber reinforced material 301 for spar segments 112, 114, 116; hardening 404 the preforms 242 to form the spar segments 112, 114, 116; and bonding the spar segments 112, 114, 116 together to form a completed spar detail 110.

Clause 2. The method 400 of clause 1 wherein bonding 406 spar segments 112, 114, 116 together comprises: applying a splice doubler (340) that partly covers a first spar segment 112 and a second spar segment 114; and bonding 406 the splice doubler 340 to the first spar segment 112 and the second spar segment 114.

Clause 3. The method 400 of clause 2 wherein applying the splice doubler 340 comprises sandwiching the splice doubler 340 between a splice region 341 of the first spar segment 112 and a splice region 341 of the second spar segment 114.

Clause 4. The method 400 of clause 2 wherein applying the splice doubler 340 comprises sandwiching a splice region 341 of the first spar segment 112 and a splice region 341 of the second spar segment 114 between a fore splice doubler and an aft splice doubler.

Clause 5. The method 400 of clause 2 wherein applying the splice doubler 340 comprises placing the splice doubler 340 in a position where the splice doubler 340 extends across a rib intersection 360 for the spar detail 110.

Clause 6. The method 400 of clause 2 wherein applying the splice doubler 340 comprises sandwiching the first spar segment 112 and the second spar segment 114 between the splice doubler 340 and a rib 290.

Clause 7. The method 400 of clause 2 wherein bonding 406 the splice doubler 340 comprises hardening the splice doubler 340 via co-bonding in a press clave.

Clause 8. The method 400 of clause 1 wherein bonding 406 the spar segments 112, 114, 116 together comprises: applying one of an adhesive and a resin to the spar segments 112, 114, 116; and forming a splice between the spar segments 112, 114, 116 in a splice region 341 of the spar segments 112, 114, 116.

Clause 9. The method 400 of clause 1 wherein bonding 406 the spar segments 112, 114, 116 together comprises forming one of a butt splice, a lap splice and a scarf splice between a splice region 341 of the first spar segment 112 and a splice region 341 of the second spar segment 114.

Clause 10. A spar for an aircraft 10, the spar comprising: a first spar segment 112 that comprises fiber reinforced material 301, the first spar 112 segment including a splice region 341; a second spar segment 114 that comprises fiber reinforced material 301-1, the second spar segment 114 including a first splice region 341 and disposed in series with the first spar segment 112; and a splice doubler 340 covering at least a portion of the splice region 341 of the first spar segment 112 and the first splice region 341 of the second spar segment 114, the splice doubler 340 bonded to the first spar segment 112 and the second spar segment 114.

Clause 11. The spar of clause 10 wherein the spar is one of a front spar 110-2 and an aft spar 110-1.

Clause 12. The spar of clause 10 wherein the splice doubler 340 is sandwiched between the splice region 341 of the first spar segment 112 and the first splice region 341 of the second spar segment 114.

Clause 13. The spar of clause 10 wherein the splice doubler 340 comprises a fore splice doubler and an aft splice doubler, the splice region 341 of the first spar segment 112 and the first splice region 341 of the second spar segment 114 sandwiched between the fore splice doubler and the aft splice doubler.

Clause 14. The spar of clause 10 wherein the splice doubler 340 extends across a rib intersection 360 for the spar.

Clause 15. The spar of clause 10 wherein the splice region 341 of the first spar segment 112 and the first splice region 341 of the second spar segment 114 are sandwiched between the splice doubler 340 and a rib.

Clause 16. The spar of clause 10 wherein the splice doubler 340 is co-bonded to the splice region 341 of the first spar segment 112 and the first splice region 341 of the second spar segment 114.

Clause 17. The spar of clause 10 wherein the second spar segment 114 further comprises a second splice region 341-1, said spar further comprising: a third spar segment 116 that comprises fiber reinforced material 301-2, the third spar segment 116 including a splice region 341-1 and is disposed in series with the second spar segment 114; and a second splice doubler 340-1 covering at least a portion of the splice region 341-1 of the third spar segment 116 and at least a portion of the second splice region 341-1 of the second spar segment 114, the second splice doubler 340-1 bonded to the second spar segment 114 and the third spar segment 116.

Clause 18. Fabricating a portion of an aircraft 10 using the spar of clause 10.

Clause 19. An aircraft wing 12 comprising a multiple segment spar detail 110, the spar detail 110 comprising: a first spar segment 112 that comprises fiber reinforced material 301, the first spar segment 112 including a splice region 341; a second spar segment 114 that comprises fiber reinforced material 301-1, the second spar segment 114 including a first splice region 341, the second spar segment 114 disposed in series with the first spar segment 112; a splice doubler 340 covering at least a portion of the splice region 341 of the first spar segment 112 and the first splice region 341 of the second spar segment 114, the splice doubler 340 co-bonded to the first spar segment 112 and the second spar segment 114; a third spar segment 116 that comprises fiber reinforced material 301-2, the third spar segment 116 including a splice region 341-1 and is disposed in series with the second spar segment 114; and a second splice doubler 340-1 covering at least a portion of the splice region 341-1 of the third spar segment 116 and at least a portion of a second splice region 341-1 of the second spar segment 114, the second splice doubler 340-1 co-bonded to the second spar segment 114 and the third spar segment 116.

Clause 20. The aircraft wing 12 of clause 19 wherein at least one of the splice doubler 340 and the second splice doubler 340-1 extends across a rib intersection 360 for the multiple segment spar detail 110.

Clause 21. A method 500 for fabricating a spar detail 110 for an aircraft 10, the method 500 comprising: fabricating 502 preforms 242 of fiber reinforced material 301, 301-1 for a first spar segment 112 and a second spar segment 114; splicing 504 an end 312 of the first spar segment 112 preform 242 to an end 321 of the second spar segment 114 preform 242 to define a splice region 341; applying 506 at least one preform for a splice doubler 340 to the splice region 341; and concurrently hardening 508 the preforms for the spar segments 112, 114 and the splice doublers 340 to form a portion of the spar detail 110.

Clause 22. The method 500 of clause 21 wherein concurrently hardening 508 the preforms 242 for the spar segments 112, 114 and the preforms for the splice doublers 340 comprises: vacuum bagging the preforms 242 for the spar segments 112, 114 and the preforms for the splice doublers 340 with a vacuum bag; consolidating the preforms 242 for the spar segments 112, 114 and the preforms for the splice doublers 340 via the vacuum bag 252; and heating the preforms 242 for the spar segments 112, 114 and the preforms for the splice doublers 340.

Clause 23. The method 500 of clause 21 wherein applying 506 at least one preform for a splice doubler 340 comprises picking up and placing the preform for the splice doubler 340 such that the splice doubler 340 extends across a rib intersection 360 for the spar detail 110.

Clause 24. The method 500 of clause 21 wherein applying 506 at least one preform for a splice doubler 340 comprises laying up a preform for the splice doubler 340 onto the spliced ends 312, 321 of the first spar segment 112 and the second spar segment 114 such that the splice doubler 340 extends across a rib intersection 360 for the spar detail 110.

Clause 25. The method 500 of clause 21 wherein applying 506 at least one preform for a splice doubler 340 comprises laying up a preform for the splice doubler 340 across an opposite side of the first spar segment 112 and the second spar segment 114 from a rib intersection 360 for the spar detail 110.

Clause 26. The method 500 of clause 21 wherein concurrently hardening 508 the preforms 242 for the spar segments 112, 114 and the splice doublers 340 comprises: arranging dry fiber preforms for the first spar segment 112, the second spar segment 114 and the splice doubler 340; and infusing the dry fiber with resin.

Clause 27. The method 500 of clause 21 wherein splicing an end 312 of the first spar segment 112 preform 242 to an end 321 of the second spar segment 114 preform 242 to define a splice region 341 comprises splicing the ends 312, 321 with at least one of a lap splice, a butt splice and a scarf splice.

Clause 28. The method 500 of clause 21 wherein fabricating 502 preforms 242 comprises: dispensing tows of fiber reinforced material 301 to form a flat charge 232; and shaping the flat charge 232 into a preform 242 having a desired cross-sectional shape.

Clause 29. The method 500 of clause 21 further comprising wherein fabricating 502 preforms 242 comprises: dispensing tows of fiber reinforced material 301 that form a flat charge 232; combining multiple flat charges 232 together into a full flat charge 233; and shaping the full flat charge 233 into a preform 242 having a desired cross-sectional shape.

Clause 30. A portion of an aircraft 10 assembled according to the method of clause 21.

Clause 31. A spar detail 110 comprising: a preform 242 for a first spar segment 112, the first spar segment 112 including a splice region 341; a preform 242 for a second spar segment 114, the second spar segment 114 including a splice region 341, the splice regions 341 disposed in series with one another in a spliced relationship; and a splice doubler 340 preform, the preforms 242 and the splice doubler 340 preform concurrently cured while the splice doubler 340 preform is covering at least a portion of the spliced regions 341 to form a portion of a spar detail 110.

Clause 32. The spar detail 110 of clause 31 wherein the splice doubler 340 is disposed at a rib intersection 360 of the spar detail 110.

Clause 33. The spar detail 110 of clause 31 wherein the splice doubler 340 is disposed at a side of the spar segments 112, 114 that is opposite a rib intersection 360 of the spar detail 110, the rib intersection 360 and the splice doubler 340 sandwiching the splice regions 341.

Clause 34. The spar detail 110 of clause 31 wherein the spliced regions 341 between the preforms 242 defines at least one of a lap splice, a butt splice, and a scarf splice.

Clause 35. The spar detail 110 of clause 31 wherein the preforms 242 and the splice doubler 340 preform comprise dry fiber that is infused with resin while the splice doubler 340 preform is covering at least a portion of the spliced regions 341.

Clause 36. The spar detail 110 of clause 31 further comprising: a preform 242 for a third spar segment 116, the third spar segment 116 including a splice region 341-1; and a second splice doubler 340-1 preform covering at least a portion of the third spar segment 116 splice region 341-1 and a portion of a second splice region 341-1 of the second spar segment 114.

Clause 37. Fabricating a portion of an aircraft 10 using the spar detail 110 of clause 31.

Clause 38. An aircraft wing 12 comprising: a first spar segment 112 that comprises fiber reinforced material 301, the first spar segment 112 including a splice region 341; a second spar segment 114 that comprises fiber reinforced material 301-1, the second spar segment 114 including a first splice region 341 and a second splice region 341-1, the first splice region 341 of the second spar segment 114 disposed in series with the splice region 341 of the first spar segment 112; a splice doubler 340 covering at least a portion of the splice region 341 of the first spar segment 112 and at least a portion of the first splice region 341 of the second spar segment 114, the splice doubler 340 co-cured with the first spar segment 112 and the second spar segment 114; a third spar segment 116 that comprises fiber reinforced material 301-2, the third spar segment 116 including a splice region 341-1 that is disposed in series with the second splice region 341-1 of the second spar segment 114; and a second splice doubler 340-1 covering at least a portion of the splice region 341-1 of the third spar segment 116 and at least a portion of a second splice region 341-1 of the second spar segment 114, the second splice doubler 340-1 co-cured with the second spar segment 114 and the third spar segment 116.

Clause 39. The aircraft wing 12 of clause 38 wherein at least one of the splice doubler 340 and the second splice doubler 340-1 extend across a rib intersection 360 for the spar detail 110.

Clause 40. The aircraft wing 12 of clause 38 wherein prior to co-curing, the first spar segment 112, the second spar segment 114, the third spar segment 116, the splice doubler 340 and the second splice doubler 340-1 comprise a dry fiber that is infused in place with a resin prior to the co-curing.

Clause 41. A method 600 for fabricating a spar detail 110 for an aircraft 10, the method 600 comprising: fabricating 602 preforms 242 of fiber reinforced material 301, 301-1, 301-2 for spar segments 112, 114, 116; hardening 604 the preforms 242 to form the spar segments 112, 114, 116; and applying 606 fasteners 278 that couple the spar segments 112, 114, 116 together to form a completed spar detail 110.

Clause 42. The method 600 of clause 41 wherein applying 606 fasteners 278 comprises: applying a splice doubler 340 that partly covers a first spar segment 112 and a second spar segment 114; and installing fasteners 278 through the splice doubler 340 into the first spar segment 112 and the second spar segment 114.

Clause 43. The method 600 of clause 42 wherein applying the splice doubler 340 comprises sandwiching the first spar segment 112 and the second spar segment 114 between the splice doubler 340.

Clause 44. The method 600 of clause 42 wherein applying the splice doubler 340 comprises placing the splice doubler 340 in a position where the splice doubler 340 extends across a rib intersection 360 for the spar detail 110.

Clause 45. The method 600 of clause 42 wherein applying the splice doubler 340 comprises placing the splice doubler 340 in a position where the splice doubler 340 extends across an opposite side of the spar detail 110 from a rib intersection 360 for the spar detail 110.

Clause 46. The method 600 of clause 42 further comprising: applying a second splice doubler 340-1 that partly covers the second spar segment 114 and a third spar segment 116; and installing fasteners 278 through the second splice doubler 340-1 into the second spar segment 114 and the third spar segment 116

Clause 47. The method 600 of clause 41 wherein fabricating 602 the preforms 242 comprises: dispensing tows of fiber reinforced material 301 that form a flat charge 232; and shaping the flat charge 232 into a preform 242 having a desired cross-sectional shape.

Clause 48. The method 600 of clause 41 wherein fabricating 602 the preforms 242 comprises: dispensing tows of fiber reinforced material 301 that form a flat charge 232; combining multiple flat charges 232 together into a full flat charge 233; and shaping the full flat charge 233 into a preform 242 having a desired cross-sectional shape.

Clause 49. A portion of an aircraft 10 assembled according to the method 600 of clause 41.

Clause 50. A spar detail 110 for an aircraft 10, the spar detail 110 comprising: a first spar segment 112 that comprises fiber reinforced material 301; a second spar segment 114 that comprises fiber reinforced material 301-1 and is disposed in series with the first spar segment 112; a splice doubler 340 covering a splice region 341 between the first spar segment 112 and the second spar segment 114; and fasteners 278 that are installed through the splice doubler 340, the first spar segment 112, and the second spar segment 114 to form at least a portion of the spar detail 110.

Clause 51. The spar detail 110 of clause 50 wherein the splice doubler 340 is disposed on the first spar segment 112 and the second spar segment 114 across a rib intersection 360.

Clause 52. The spar detail 110 of clause 50 wherein the splice doubler 340 is disposed on an opposite side of first spar segment 112 and the second spar segment 114 from a rib intersection 360.

Clause 53. The spar detail 110 of clause 50 further comprising: a third spar segment 116 that comprises fiber reinforced material 301-2 and is disposed in series with the second spar segment 114; a second splice doubler 340-1 covering a splice region 341-1 between the second spar segment 114 and the third spar segment 116; and fasteners 278 that are installed through the second splice doubler 340-1, the second spar segment 114, and the third spar segment 116 to form at least a portion of the spar detail 110.

Clause 54. The spar detail 110 of clause 50 wherein the first spar segment 112 and the second spar segment 114 are sandwiched between the splice doubler 340.

Clause 55. Fabricating a portion of an aircraft 10 using the spar detail 110 of clause 50.

Clause 56. An aircraft wing 12 comprising: a first spar segment 112 that comprises fiber reinforced material 301, the first spar segment 112 including a splice region 341; a second spar segment 114 that comprises fiber reinforced material 301, the second spar segment 114 including a first splice region 341 and a second splice region 341-1, the first splice region 341 of the second spar segment 114 disposed in series with the splice region 341 of the first spar segment 112; a splice doubler 340 covering at least a portion of the splice region 341 of the first spar segment 112 and at least a portion of the first splice region 341 of the second spar segment 114; and fasteners 278 that are installed through the splice doubler 340, the splice region 341 of the first spar segment 112, and the first splice region 341 of the second spar segment 114 to form at least a portion of a spar detail 110.

Clause 57. The aircraft wing 12 of clause 56 further comprising: a third spar segment 116 that comprises fiber reinforced material 301, the third spar segment 116 including a splice region 341-1 that is disposed in series with the second splice region 341-1 of the second spar segment 114; a second splice doubler 340-1 covering at least a portion of the splice region 341-1 of the third spar segment 116 and at least a portion of a second splice region 341-1 of the second spar segment 114; and fasteners 278 that are installed through the second splice doubler 340-1, the second splice region 341-1 of the second spar segment 114, and the splice region 341-1 of the third spar segment 116 to form at least a portion of the spar detail 110.

Clause 58. The aircraft wing 12 of clause 57 wherein at least one of the splice doubler 340 and the second splice doubler 340-1 extend across a rib intersection 360.

Clause 59. The aircraft wing of clause 57 wherein at least one of: the splice doubler 340 is disposed on an opposite side of the first spar segment 112 and the second spar segment 114 from a rib intersection 360; and the second splice doubler 340-1 is disposed on an opposite side of the second spar segment 114 and the third spar segment 116 from a rib intersection 360.

Clause 60. Fabricating a portion of an aircraft 10 using the aircraft wing 12 of clause 57.

Clause 61. A method 700 for fabricating a spar for an aircraft 10, the method comprising: fabricating 702 preforms 242 of fiber reinforced material 301 for spar segments 112, 114, 116, at least one of the spar segments 112, 114, 116 comprising a kink 370, each kink 370 being contained entirely within a preform 242; hardening 704 the preforms 242 to form spar segments 112, 114, 116; and assembling 706 the spar segments 112, 114, 116 together to form a completed spar detail 110 exhibiting at least one of the kinks 370.

Clause 62. The method 700 of clause 61 wherein each kink 370 comprises an inflection point 381 where there is an intersection of a first neutral axis 350 and a second neutral axis 350-1 of the spar.

Clause 63. The method 700 of clause 61 wherein fabricating 702 the preforms 242 comprises changing an axial direction of the preform 242 at each kink 370.

Clause 64. The method 700 of clause 61 wherein fabricating 702 the preforms 242 comprises changing an axial direction of the preform 242 at each kink 370, the change in axial direction being an inflection angle between two and ten degrees.

Clause 65. The method 700 of clause 61 wherein each preform 242 includes a first end and a second end opposite the first end and fabricating 702 the preforms 242 comprises placing each kink 370 at least one foot from an end of the preform 242.

Clause 66. The method 700 of clause 61 wherein each preform 242 includes at least one splice region 341, 341-1 and assembling 706 the spar segments 112, 114, 116 comprises applying splice doublers 340, 340-1 to the spar segments 112, 114, 116 within the splice regions 341, 341-1.

Clause 67. The method 700 of clause 66 wherein applying splice doublers 340, 340-1 to the spar segments 112, 114, 116 comprises: forming at least one of a lap splice, a butt splice and a scarf splice between adjacent splice regions 341, 341-1; and attaching the splice doubler 341, 341-1 to the splice regions 340, 340-1 using one of co-curing, co-bonding and fasteners 278.

Clause 68. The method 700 of clause 66 wherein applying splice doublers 340, 340-1 to the spar segments 112, 114, 116 within the splice regions 341, 341-1 comprises disposing the splice doubler 340, 340-1 across a rib intersection 360 on the spar.

Clause 69. The method 700 of clause 66 wherein applying splice doublers 340, 340-1 to the spar segments 112, 114, 116 within the splice regions 341, 341-1 comprises sandwiching the splice regions 341, 341-1 between the splice doubler 340, 340-1 and a rib.

Clause 70. The method 700 of clause 66 wherein applying splice doublers 340, 340-1 to the spar segments 112, 114, 116 within the splice regions 341, 341-1 comprises sandwiching the splice regions 341-341-1 between a fore splice doubler and an aft splice doubler.

Clause 71. The method 700 of clause 61 wherein each preform 242 includes at least one splice region 341, 341-1 and fabricating 702 preforms 242 of fiber reinforced material 301 for spar segments 112, 114, 116 comprises placing the kink 370 outside of the splice regions 341-, 341-1 of the spar segment 112, 114, 116.

Clause 72. An aircraft spar detail 110 comprising: a first spar segment 112 that comprises fiber reinforced material 301, at least one splice region 341; a second spar segment 114 that comprises fiber reinforced material 301, at least one splice region 341, and a kink 370 outside of the splice regions 341, with respective splice regions 341 disposed in series with one another; and a splice doubler 340 that covers at least a portion of the splice region 341 of the first spar segment 112 and at least a portion of the corresponding splice region 341 of the second spar segment 114, the splice doubler 340 coupled to the first spar segment 112 and the second spar segment 114.

Clause 73. The aircraft spar detail 110 of clause 72 wherein the kink 370 comprises a change in axial direction of the spar detail 110.

Clause 74. The aircraft spar detail 110 of clause 73 wherein the change in axial direction is between two and ten degrees.

Clause 75. The aircraft spar detail 110 of clause 72 wherein the kink 370 is separated from an end of the second spar segment 114 by more than one foot.

Clause 76. The aircraft spar detail 110 of clause 72 wherein the first spar segment 112 comprises a kink 370 outside of the splice region 341.

Clause 77. The aircraft spar detail 110 of clause 72 wherein the splice doubler 340 is located across a rib intersection 360.

Clause 78. The aircraft spar detail 110 of clause 77 wherein the splice doubler 340 comprises one of: a fore splice doubler and an aft splice doubler that sandwiches the splice regions 341; and a splice doubler 340 placed to sandwich the splice regions 341 between the splice doubler 340 and a rib.

Clause 79. The aircraft spar detail 110 of clause 72 further comprising: a third spar segment 116 that comprises fiber reinforced material 301, at least one splice region 341-1, and a kink 370 outside of the splice regions 341-1, the splice regions 341-1 disposed in series with the corresponding splice region 341-1 of the second spar segment 114; and a second splice doubler 340-1 that covers at least a portion of the splice region 341-1 of the third spar segment 116 and at least a portion of the corresponding splice region 341-1 of the second spar segment 114, the second splice doubler 340-1 coupled with the second spar segment 114 and the third spar segment 116.

Clause 80. An aircraft wing 12 comprising: a first spar segment 112 that comprises fiber reinforced material 301, the first spar segment 112 including a splice region 341; a second spar segment 114 that comprises fiber reinforced material 301, the second spar segment 114 including a first splice region 341 and a second splice region 341-1, the first splice region 341 of the second spar segment 114 disposed in series with the splice region 341 of the first spar segment 112; a splice doubler 340 covering at least a portion of the splice region 341 of the first spar segment 112 and at least a portion of the first splice region 341 of the second spar segment 114; a third spar segment 116 that comprises fiber reinforced material 301, the third spar segment 116 including a splice region 341-1 that is disposed in series with the second splice region 341-1 of the second spar segment 114; a second splice doubler 340-1 covering at least a portion of the splice region 341-1 of the third spar segment 116 and at least a portion of a second splice region 341-1 of the second spar segment 114; and at least one kink 370 in one or more of the first spar segment 112, the second spar segment 114, and the third spar segment 116, the at least one kink 370 outside of the splice regions 341, 341-1 and comprising a change in axial direction of the spar segment 112, 114, 116 where the kink 370 is located.

Clause 81. A method 800 for fabricating a spar detail 110 for an aircraft 10, the method 800 comprising: fabricating 802 a preform 242 for a first spar segment 112, the preform 242 including a sub-kink 371-1 proximate one end of the first spar segment 112; fabricating 802 a preform 242 for a second spar segment 114, the preform 242 including a sub-kink 371 proximate one end of the second spar segment 114; aligning 804 the ends of the preforms 242 such that the sub-kinks 371-1, 371 are proximate one another within a splice region 341; and joining 806 the spar segments 112, 114 together in the splice region 341 to form at least a portion of the spar detail 110 exhibiting a kink 370.

Clause 82. The method 800 of clause 81 wherein joining 806 the spar segments 112, 114 comprises using at least one of co-curing, co-bonding, installation of splice doublers 340, and installation of fasteners 278 to join the spar segments 112, 114 in the splice region 341.

Clause 83. The method 800 of clause 81 wherein fabricating 802 the preforms 242 comprises fabricating 802 the preforms 242 such that each sub-kink 371-1, 371 has an equal angular deviation.

Clause 84. The method 800 of clause 81 wherein fabricating 802 the preforms 242 comprises fabricating 802 the preforms 242 such that the sub-kinks 371-1, 371 have a non-equal angular deviation.

Clause 85. The method 800 of clause 81 wherein fabricating 802 the preforms 242 comprises fabricating 802 the preforms 242 such that the sub-kinks 371-1, 371, together, change an axial direction of the spar detail 110 between two and ten degrees.

Clause 86. The method 800 of clause 81 wherein aligning 804 the ends of the preforms 242 comprises forming one of a lap splice, a butt splice, and a scarf splice in the splice region 341 with the ends of the preforms 242.

Clause 87. The method 800 of clause 81 wherein joining 806 the spar segments 112, 114 together comprises applying a splice doubler 340 to the splice region 341, the splice region 341 opposite a rib intersection 360.

Clause 88. The method 800 of clause 81 wherein joining 806 the spar segments 112, 114 together comprises sandwiching the sub-kinks 371-1, 371 between a splice doubler 340 and a rib.

Clause 89. The method 800 of clause 81 wherein joining 806 the spar segments 112, 114 together comprises sandwiching the sub-kinks 371-1, 371 between a fore splice doubler and an aft splice doubler.

Clause 90. A portion of an aircraft 10 assembled according to the method 800 of clause 81.

Clause 91. A spar detail 110 for an aircraft 10, the spar detail 110 comprising: a first spar segment 112 that comprises fiber reinforced material 301 and includes a sub-kink 371-1 disposed at an end; a second spar segment 114 that comprises fiber reinforced material 301 and includes a sub-kink 371 disposed at an end, the end of the first spar segment 112 having the sub-kink 371-1 adjacent to the end of the second spar segment 114 having the sub-kink 371, such that the sub-kinks 371-1, 371 together form a kink 370 and the ends define a splice region 341; and a splice doubler 340 that structurally unites the first spar segment 112 and the second spar segment 114 within the splice region 341.

Clause 92. The spar detail 110 of clause 91 wherein: the sub-kink 371-1 associated with the first spar segment 112 is disposed within one foot of the end of the first spar segment 112; and the sub-kink 371 associated with the second spar segment 114 is disposed within one foot of the end of the second spar segment 114.

Clause 93. The spar detail 110 of clause 91 wherein each sub-kink 371-1, 371 alters an axial direction of the spar detail 110 by one half of an amount of the kink 370.

Clause 94. The spar detail 110 of clause 91 wherein the sub-kinks 371-1, 371, together, alter an axial direction of the spar detail 110 between two and ten degrees.

Clause 95. The spar detail 110 of clause 91 wherein the splice doubler 340 is disposed opposite a rib intersection 360 defined for the spar detail 110.

Clause 96. The spar detail 110 of clause 91 wherein the splice doubler 340 is disposed to sandwich the splice region 341 and the sub-kinks 371-1, 371.

Clause 97. The spar detail 110 of clause 91 wherein to structurally unite the first spar segment 112 and the second spar segment 114, the splice doubler 340 is one of: co-bonded, co-cured, and attached with fasteners 278 to the first spar segment 112 and the second spar segment 114.

Clause 98. Fabricating a portion of an aircraft 10 using the spar detail 110 of clause 91.

Clause 99. An aircraft wing 12 comprising: a first spar segment 112 that comprises fiber reinforced material 301 and includes a sub-kink 371-1 disposed at an end; a second spar segment 114 that comprises fiber reinforced material 301 and includes a sub-kink 371 disposed at an end, the end of the first spar segment 112 having the sub-kink 371-1 adjacent to the end of the second spar segment 114 having the sub-kink 371, such that the sub-kinks 371-1, 371 together form a kink 370 and the ends define a splice region 341; a splice doubler 340 that structurally unites the first spar segment 112 and the second spar segment 114 within the splice region 341; a third spar segment 116 that comprises fiber reinforced material 301, the third spar segment 116 including a splice region 341-1 that is disposed in series with a second splice region 341-1 at an opposite end of the second spar segment 114; and a second splice doubler 340-1 covering at least a portion of the splice region 341-1 of the third spar segment 116 and at least a portion of a second splice region 341-1 of the second spar segment 114.

Clause 100. The aircraft wing 12 of clause 99 wherein the splice doubler 340 is one of: co-bonded, co-cured, and attached with fasteners 278 to the first spar segment 112 and the second spar segment 114.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a spar detail for an aircraft, the method comprising:
fabricating uncured preforms of fiber reinforced material for spar segments;
splicing the uncured preforms for the spar segments together end to end to form a spar detail;
after the splicing, applying a preform for a splice doubler to the spar detail that partly covers a first spar segment of the spar segments and a second spar segment of the spar segments, wherein the preform for the splice doubler is on a first side of the spar detail, wherein the first side is opposite a second side of the spar detail having a rib intersection; and
co-curing the preform for the splice doubler with the preforms for the first spar segment and the second spar segment to form a completed spar detail; and
wherein applying the preform for the splice doubler comprises placing the preform for the splice doubler in a position where the preform for the splice doubler extends across the rib intersection for the spar detail.

2. The method of claim 1, wherein applying the preform for the splice doubler comprises sandwiching an outboard end of the first spar segment and an inboard end of the second spar segment between a fore splice doubler and an aft splice doubler.

3. The method of claim 1, wherein applying the preform for the splice doubler comprises sandwiching the first spar segment and the second spar segment between the splice doubler and a rib.

4. The method of claim 1, wherein co-curing the preform for the splice doubler comprises hardening the preform for the splice doubler with the preforms for the first spar segment and the second spar segment in a press clave.

5. The method of claim 1, wherein splicing the uncured preforms for the spar segments together comprises:
applying one of an adhesive and a resin to the spar segments; and
forming a splice between the spar segments in a splice region of the spar segments.

6. The method of claim 1, wherein splicing the uncured preforms for the spar segments together comprises forming one of a butt splice, a lap splice and a scarf splice between an outboard end of the first spar segment and an inboard end of the second spar segment.

7. The method of claim 1, wherein co-curing the preform for the splice doubler with the preforms for the first spar segment and the second spar segment comprises:
vacuum bagging the preforms for the first spar segment and the second spar segment and the preform for the splice doubler with a vacuum bag;
consolidating the preforms for the first spar segment and the second spar segment and the preform for the splice doubler via the vacuum bag; and
heating the preforms for the first spar segment and the second spar segment and the preform for the splice doubler.

8. A method for fabricating a spar detail for an aircraft, the method comprising:
fabricating an uncured first spar segment preform of fiber reinforced material and an uncured second spar segment preform of fiber reinforced material;
splicing an end of the uncured first spar segment preform to an end of the uncured second spar segment preform to define a splice region;
after the splicing, applying at least one splice doubler preform to the splice region, wherein the at least one splice doubler preform is applied on a first side of the spar detail, wherein the first side is opposite a second side of the spar detail having a rib intersection; and
concurrently hardening an entire assembly comprising the first spar segment preform, the second spar segment preform, and the at least one splice doubler preform to form a completed spar detail.

9. The method of claim 8, wherein concurrently hardening the first spar segment preform and the second spar segment preform and the at least one splice doubler preform comprises:
vacuum bagging the first spar segment preform, the second spar segment preform, and the at least one splice doubler preform with a vacuum bag;
consolidating the first spar segment preform, the second spar segment preform, and the at least one splice doubler preform via the vacuum bag; and
heating the first spar segment preform, the second spar segment preform, and the at least one splice doubler preform.

10. The method of claim 8, wherein:
applying the at least one splice doubler preform comprises picking up and placing a splice doubler preform such that the splice doubler preform extends across a rib intersection for the spar detail.

11. The method of claim 8, wherein:
applying the at least one splice doubler preform comprises laying up a splice doubler preform onto the spliced ends of the first spar segment preform and the second spar segment preform such that the splice doubler preform extends across a rib intersection for the spar detail.

12. The method of claim 8, wherein:
applying the at least one splice doubler preform comprises laying up a splice doubler preform across an opposite side of the first spar segment preform and the second spar segment preform from a rib intersection for the spar detail.

13. The method of claim 8, wherein splicing the end of the first spar segment preform to the end of the second spar segment preform to define the splice region comprises splicing the ends with at least one of a lap splice, a butt splice and a scarf splice.

14. The method of claim 8, wherein fabricating the first spar segment preform and the second spar segment preform comprises:
dispensing tows of fiber reinforced material to form a flat charge; and
shaping the flat charge into a preform having a desired cross-sectional shape.

15. The method of claim 8, further comprising wherein fabricating the first spar segment preform and the second spar segment preform comprises:
dispensing tows of fiber reinforced material that form a flat charge;
combining multiple flat charges together into a full flat charge; and
shaping the full flat charge into a preform having a desired cross-sectional shape.

16. The method of claim 8, wherein applying the at least one splice doubler preform comprises sandwiching an outboard end of the uncured first spar segment preform and an inboard end of the uncured second spar segment preform between a fore splice doubler and an aft splice doubler.

17. The method of claim 8, wherein applying the at least one splice doubler preform comprises sandwiching the uncured first spar segment preform and the uncured second spar segment preform between the at least one splice doubler and a rib.

18. The method of claim 8, wherein concurrently hardening the entire assembly comprises hardening the at least one splice doubler preform with the first spar segment preform and the second spar segment preform in a press clave.

19. The method of claim 8, wherein splicing the end of the uncured first spar segment preform to the end of the uncured second spar segment preform comprises:
applying one of an adhesive and a resin to the uncured first spar segment preform and the uncured second spar segment preform; and
forming a splice between the uncured first spar segment preform and the uncured second spar segment preform in the splice region.

20. A method for fabricating a spar detail for an aircraft, the method comprising:
fabricating an uncured first spar segment preform of fiber reinforced material and an uncured second spar segment preform of fiber reinforced material;
splicing an end of the uncured first spar segment preform to an end of the uncured second spar segment preform to define a splice region;
after the splicing, applying at least one splice doubler preform to the splice region, wherein the at least one splice doubler preform is applied on a first side of the spar detail, wherein the first side is opposite a second side of the spar detail having a rib intersection; and
concurrently hardening an entire assembly comprising the first spar segment preform, the second spar segment preform, and the at least one splice doubler preform to form a portion of the spar detail;
wherein concurrently hardening the first spar segment preform, the second spar segment preform, and the at least one splice doubler preform to form the portion of the spar detail comprises:
arranging dry fiber preforms for the first spar segment, the second spar segment and the splice doubler; and
infusing the dry fiber preforms with resin.

* * * * *